（12）United States Patent
Tsai et al.

(10) Patent No.: US 10,289,142 B2
(45) Date of Patent: *May 14, 2019

(54) INDUCTION TYPE POWER SUPPLY SYSTEM AND INTRUDING METAL DETECTION METHOD THEREOF

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., New Taipei (TW)

( * ) Notice: Subject to any disclaimer, the term of this patent is extended or adjusted under 35 U.S.C. 154(b) by 388 days.

This patent is subject to a terminal disclaimer.

(21) Appl. No.: 15/231,795

(22) Filed: Aug. 9, 2016

(65) Prior Publication Data

US 2016/0349782 A1 Dec. 1, 2016

Related U.S. Application Data

(63) Continuation-in-part of application No. 15/197,796, filed on Jun. 30, 2016, and a continuation-in-part of
(Continued)

(30) Foreign Application Priority Data

Feb. 1, 2011 (TW) .............................. 100103836 A
May 3, 2013 (TW) .............................. 102115983 A
(Continued)

(51) Int. Cl.
*G05B 15/02* (2006.01)
*G05F 1/66* (2006.01)
(Continued)

(52) U.S. Cl.
CPC ............... *G05F 1/66* (2013.01); *G05B 15/02* (2013.01); *H02J 50/05* (2016.02); *H02J 50/12* (2016.02); *H02J 50/60* (2016.02); *H02J 50/80* (2016.02)

(58) Field of Classification Search
CPC .. G05B 15/02; G05F 1/66; H02J 50/05; H02J 50/12; H02J 50/60; H02J 50/80
See application file for complete search history.

(56) References Cited

U.S. PATENT DOCUMENTS 3,573,817 A * 4/1971 Akers .................... G08B 13/00
340/522
4,393,516 A 7/1983 Itani
(Continued)

FOREIGN PATENT DOCUMENTS

| CN | 1142649 A | 2/1997 |
|---|---|---|
| CN | 1476535 A | 2/2004 |

(Continued)

OTHER PUBLICATIONS

Yang, "A Multi-Coil Wireless Charging System with Parasitic Mental Detection", Donghua University Master Dissertation, China Master's Theses Full-text Database, Engineering Technology II, vol. 09, May 2014.

*Primary Examiner* — Abdelmoniem I Elamin
(74) *Attorney, Agent, or Firm* — Winston Hsu

(57) ABSTRACT

A method used for an induction type power supply system, for detecting whether an intruding metal exists in a power transmission range of the induction type power supply system, includes interrupting at least one driving signal of the induction type power supply system to stop driving a supplying-end coil of the induction type power supply system; obtaining a first attenuation slope during a first period when driving of the supplying-end coil is stopped, and obtaining a second attenuation slope during a second
(Continued)

period when driving of the supplying-end coil is stopped; and determining whether the intruding metal exists in the power transmission range of the induction type power supply system according to the first attenuation slope and the second attenuation slope.

20 Claims, 11 Drawing Sheets

Related U.S. Application Data application No. 15/005,014, filed on Jan. 25, 2016, now Pat. No. 10,114,396, said application No. 15/197,796 is a continuation-in-part of application No. 14/876,788, filed on Oct. 6, 2015, now Pat. No. 9,831,687, and a continuation-in-part of application No. 14/822,875, filed on Aug. 10, 2015, now Pat. No. 9,960,639, and a continuation-in-part of application No. 14/731,421, filed on Jun. 5, 2015, now Pat. No. 10,038,338, which is a continuation-in-part of application No. 14/017,321, filed on Sep. 4, 2013, now Pat. No. 9,628,147, said application No. 14/876,788 is a continuation-in-part of application No. 14/017,321, which is a continuation-in-part of application No. 13/541,090, filed on Jul. 3, 2012, now Pat. No. 9,075,587, said application No. 14/731,421 is a continuation-in-part of application No. 13/541,090, said application No. 14/017,321 is a continuation-in-part of application No. 13/212,564, filed on Aug. 18, 2011, now Pat. No. 8,941,267, which is a continuation-in-part of application No. 13/154,965, filed on Jun. 7, 2011, now Pat. No. 8,810,072.

(30) Foreign Application Priority Data

| Jan. 14, 2015 | (TW) | 104101227 A |
| Jun. 2, 2015 | (TW) | 104117722 A |
| Jun. 30, 2015 | (TW) | 104121025 A |
| Oct. 28, 2015 | (TW) | 104135327 A |
| Apr. 14, 2016 | (TW) | 105111620 A |
| May 13, 2016 | (TW) | 105114827 A |

(51) Int. Cl.
*H02J 50/05* (2016.01)
*H02J 50/12* (2016.01)
*H02J 50/60* (2016.01)
*H02J 50/80* (2016.01)

(56) References Cited

U.S. PATENT DOCUMENTS

| 5,270,998 A | 12/1993 | Uchiumi |
| 7,720,452 B2 | 5/2010 | Miyahara |
| 7,939,963 B2 | 5/2011 | Chang |
| 8,072,310 B1 | 12/2011 | Everhart |
| 8,422,420 B1 | 4/2013 | Gulasekaran |
| 8,731,116 B2 | 5/2014 | Norconk |
| 9,048,881 B2 | 6/2015 | Tsai |
| 9,075,587 B2 | 7/2015 | Tsai |
| 9,553,485 B2 | 1/2017 | Singh |
| 9,995,777 B2 * | 6/2018 | Von Novak, III ...... H02J 7/025 |
| 10,122,220 B2 * | 11/2018 | Sankar ............... H02J 50/60 |
| 2003/0123168 A1 | 7/2003 | Yokomizo |
| 2005/0076102 A1 | 4/2005 | Chen |
| 2008/0030398 A1 | 2/2008 | Nakamura |
| 2009/0026844 A1 | 1/2009 | Iisaka |
| 2009/0271048 A1 | 10/2009 | Wakamatsu |
| 2009/0284082 A1 | 11/2009 | Mohammadian |
| 2009/0302800 A1 | 12/2009 | Shiozaki |
| 2010/0098177 A1 | 4/2010 | Hamaguchi |
| 2010/0225173 A1 | 9/2010 | Aoyama |
| 2010/0237943 A1 | 9/2010 | Kim |
| 2010/0270867 A1 | 10/2010 | Abe |
| 2011/0196544 A1 | 8/2011 | Baarman |
| 2011/0241436 A1 | 10/2011 | Furukawa |
| 2012/0153739 A1 | 6/2012 | Cooper |
| 2012/0272076 A1 | 10/2012 | Tsai |
| 2012/0293009 A1 | 11/2012 | Kim |
| 2013/0015705 A1 * | 1/2013 | Abe ................ H02J 5/005 307/29 |
| 2013/0049484 A1 | 2/2013 | Weissentern |
| 2013/0162054 A1 | 6/2013 | Komiyama |
| 2013/0162204 A1 | 6/2013 | Jung |
| 2013/0175873 A1 | 7/2013 | Kwon |
| 2013/0175937 A1 | 7/2013 | Nakajo |
| 2013/0176023 A1 | 7/2013 | Komiyama |
| 2013/0267213 A1 | 10/2013 | Hsu |
| 2013/0342027 A1 | 12/2013 | Tsai |
| 2014/0024919 A1 | 1/2014 | Metzenthen |
| 2014/0077616 A1 | 3/2014 | Baarman |
| 2014/0084857 A1 | 3/2014 | Liu |
| 2014/0152251 A1 | 6/2014 | Kim |
| 2014/0184152 A1 | 7/2014 | Van Der Lee |
| 2014/0355314 A1 | 12/2014 | Ryan |
| 2015/0008756 A1 | 1/2015 | Lee |
| 2015/0028875 A1 | 1/2015 | Irie |
| 2015/0044966 A1 | 2/2015 | Shultz |
| 2015/0054355 A1 | 2/2015 | Ben-Shalom |
| 2015/0123602 A1 | 5/2015 | Patino |
| 2015/0162054 A1 | 6/2015 | Ishizu |
| 2015/0162785 A1 | 6/2015 | Lee |
| 2015/0263531 A1 | 9/2015 | Kozakai |
| 2015/0285926 A1 | 10/2015 | Oettinger |
| 2015/0372493 A1 * | 12/2015 | Sankar .................. H02J 7/025 307/104 |
| 2016/0064951 A1 | 3/2016 | Yamamoto |
| 2016/0064952 A1 * | 3/2016 | Matsumoto ............ H01F 38/14 307/104 |
| 2016/0072336 A1 * | 3/2016 | Tamino .................. H02J 17/00 320/108 |
| 2016/0241086 A1 | 8/2016 | Jung |
| 2018/0138756 A1 * | 5/2018 | Bae ......................... H02J 50/12 |

FOREIGN PATENT DOCUMENTS

| CN | 1930790 A | 3/2007 |
| CN | 101106388 A | 1/2008 |
| CN | 101907730 A | 12/2010 |
| CN | 101924399 A | 12/2010 |
| CN | 101978571 A | 2/2011 |
| CN | 102054057 A | 5/2011 |
| CN | 102055250 A | 5/2011 |
| CN | 102157991 A | 8/2011 |
| CN | 102474133 A | 5/2012 |
| CN | 202404630 U | 8/2012 |
| CN | 102804619 A | 11/2012 |
| CN | 103069689 A | 4/2013 |
| CN | 103248130 A | 8/2013 |
| CN | 103425169 A | 12/2013 |
| CN | 103457361 A | 12/2013 |
| CN | 103852665 A | 6/2014 |
| CN | 103975497 A | 8/2014 |
| CN | 104160300 A | 11/2014 |
| CN | 204190475 U | 3/2015 |
| CN | 104521151 A | 4/2015 |
| CN | 104685760 A | 6/2015 |
| CN | 104734370 A | 6/2015 |
| CN | 105049008 A | 11/2015 |
| CN | 105449875 A | 3/2016 |
| CN | 205105005 U | 3/2016 |
| CN | 106134037 A | 11/2016 |
| CN | 106571692 A | 4/2017 |
| EP | 2608419 A2 | 6/2013 |
| EP | 2 793 355 A1 | 10/2014 |
| EP | 3 160 008 A1 | 4/2017 |
| JP | 2008206305 A | 9/2008 |

(56) References Cited

FOREIGN PATENT DOCUMENTS

| | | | |
|---|---|---|---|
| JP | 2010213414 | A | 9/2010 |
| JP | 2013135518 | A | 7/2013 |
| JP | 2014171371 | A | 9/2014 |
| JP | 6122402 | | 4/2017 |
| JP | 2017511117 | A | 4/2017 |
| KR | 100650628 | B1 | 11/2006 |
| TW | 201034334 | A1 | 9/2010 |
| TW | I389416 | | 3/2013 |
| TW | I408861 | | 9/2013 |
| TW | 201414130 | | 4/2014 |
| TW | 201415752 | | 4/2014 |
| TW | 201440368 | A | 10/2014 |
| TW | I459676 | B | 11/2014 |
| TW | I472897 | | 2/2015 |
| TW | I483509 | B | 5/2015 |
| TW | 201605143 | A | 2/2016 |
| TW | I577108 | B | 4/2017 |
| TW | I596546 | B | 8/2017 |
| TW | I604678 | B | 11/2017 |
| WO | 2013043974 | A2 | 3/2013 |
| WO | 2015154086 | A1 | 10/2015 |
| WO | 2016/159788 | A1 | 10/2016 |

\* cited by examiner

INDUCTION TYPE POWER SUPPLY SYSTEM AND INTRUDING METAL DETECTION METHOD THEREOF

CROSS REFERENCE TO RELATED APPLICATIONS

This application is a continuation-in-part application of U.S. application Ser. No. 15/005,014, filed on Jan. 25, 2016, now U.S. Pat. No. 10,114,396, and a continuation-in-part application of U.S. application Ser. No. 15/197,796, filed on Jun. 30, 2016, still pending, which is further a continuation-in-part application of U.S. application Ser. No. 14/822,875, filed on Aug. 10, 2015, now U.S. Pat. No. 9,960,639, a continuation-in-part application of U.S. application Ser. No. 14/731,421, filed on Jun. 5, 2015, now U.S. Pat. No. 10,038,338, and a continuation-in-part application of U.S. application Ser. No. 14/876,788, filed on Oct. 6, 2015, now U.S. Pat. No. 9,831,687, the contents of which are incorporated herein by reference.

U.S. application Ser. No. 14/731,421 is further a continuation-in-part application of U.S. application Ser. No. 14/017,321, filed on Sep. 4, 2013, now U.S. Pat. No. 9,628,147, and a continuation-in-part application of U.S. application Ser. No. 13/541,090, filed on Jul. 3, 2012, now U.S. Pat. No. 9,075,587. U.S. application Ser. No. 14/017,321 is further a continuation-in-part application of U.S. application Ser. No. 13/541,090, filed on Jul. 3, 2012, now U.S. Pat. No. 9,075,587, and a continuation-in-part application of U.S. application Ser. No. 13/212,564, filed on Aug. 18, 2011, now U.S. Pat. No. 8,941,267, which is further a continuation-in-part application of U.S. application Ser. No. 13/154,965, filed on Jun. 7, 2011, now U.S. Pat. No. 8,810,072. U.S. application Ser. No. 14/876,788 is further a continuation-in-part application of U.S. application Ser. No. 14/017,321, filed on Sep. 4, 2013, now U.S. Pat. No. 9,628,147.

BACKGROUND OF THE INVENTION

1. Field of the Invention

The present invention relates to a method used for an induction type power supply system, and more particularly, to a method of detecting whether there is an intruding metal existing in a power transmission range of an induction type power supply system.

2. Description of the Prior Art

An induction type power supply system includes a power supplying terminal and a power receiving terminal. The power supplying terminal applies a driver circuit to drive a supplying-end coil to generate resonance, in order to send electromagnetic waves. A coil of the power receiving terminal may receive the electromagnetic waves and perform power conversion to generate DC power to be supplied for a device in the power receiving terminal. In general, both sides of the coil are capable of transmitting and receiving electromagnetic waves; hence, a magnetic material is always disposed on the non-induction side of the coil, allowing the electromagnetic energy to be aggregated on the induction side. The magnetic material close to the coil may enlarge the coil inductance, and thereby increase the electromagnetic induction capability. In addition, the electromagnetic energy exerted on a metal may heat the metal. This principle is similar to an induction cooker. Therefore, another function of the magnetic material is to isolate the electromagnetic energy, in order to prevent the electromagnetic energy from interfering with the operations of the device behind the coil, and also prevent the electromagnetic energy from heating surrounding metals for safety.

In the induction type power supply system, an induction coil is included in each of the power supplying terminal and the power receiving terminal for sending power energy and control signals. The safety issue should be considered in this system. However, a user may intentionally or unintentionally insert a metal between these induction coils when using the induction type power supply system. If an intruding metal appears during power transmission, the electromagnetic energy generated by the coil may rapidly heat the intruding metal and cause an accident such as burning or exploding. Therefore, the industry pays much attention to this safety issue, and related products should have the capability of detecting whether an intruding metal exists. When there exists an intruding metal, power supply output may be cut off for protection.

In the prior art, a power loss is calculated by measuring the output power of the power supplying terminal and the input power of the power receiving terminal, and existence of the intruding metal is determined based on the calculated power loss and a predetermined threshold value. If the power loss exceeds the threshold value, the system may determine that there is an intruding metal. However, the above method of determining the intruding metal may not achieve satisfactory protection effects. For example, when a smaller intruding metal such as a coin, key or paper clip exists in the power transmission region of the power supplying terminal, the small intruding metal may not be successfully detected by the above method. Also, if the threshold value for determination is too strict, small noise interferences may be wrongly determined to be an intruding metal, which results in unnecessary power cut. Thus, there is a need for improvement over the prior art.

SUMMARY OF THE INVENTION

It is therefore an objective of the present invention to provide a method of detecting whether there is an intruding metal existing in a power transmission range of an induction type power supply system and the related induction type power supply system, to realize a more effective intruding metal detection, in order to enhance the protection effects of the induction type power supply system.

The present invention discloses a method used for an induction type power supply system, for detecting whether an intruding metal exists in a power transmission range of the induction type power supply system. The method comprises interrupting at least one driving signal of the induction type power supply system to stop driving a supplying-end coil of the induction type power supply system; obtaining a first attenuation slope during a first period when driving of the supplying-end coil is stopped, and obtaining a second attenuation slope during a second period when driving of the supplying-end coil is stopped; and determining whether the intruding metal exists in the power transmission range of the induction type power supply system according to the first attenuation slope and the second attenuation slope.

The present invention further discloses an induction type power supply system, which comprises a supplying-end module. The supplying-end module comprises a supplying-end coil, a resonant capacitor, at least one power driver unit and a processor. The resonant capacitor, coupled to the supplying-end coil, is used for performing resonance together with the supplying-end coil. The at least one power driver unit, coupled to the supplying-end coil and the resonant capacitor, is used for sending at least one driving signal to the supplying-end coil to drive the supplying-end coil to generate power and interrupting the at least one driving signal to stop driving the supplying-end coil. The processor is used for receiving a coil signal of the supplying-end coil and performing the following steps: obtaining a first attenuation slope during a first period when driving of the supplying-end coil is stopped, and obtaining a second attenuation slope during a second period when driving of the supplying-end coil is stopped; and determining whether an intruding metal exists in the power transmission range of the induction type power supply system according to the first attenuation slope and the second attenuation slope.

The present invention further discloses a method used for an induction type power supply system, for detecting whether an intruding metal exists in a power transmission range of the induction type power supply system. The method comprises interrupting at least one driving signal of the induction type power supply system to stop driving a supplying-end coil of the induction type power supply system; setting a reference voltage level; detecting a coil signal of the supplying-end coil to obtain time points of two continuous times the coil signal rises to exceed the reference voltage level when driving of the supplying-end coil is stopped; obtaining a length of oscillation cycle of the coil signal when driving of the supplying-end coil is stopped according to the time points of two continuous times the coil signal rises to exceed the reference voltage level; and obtaining an attenuation slope of the coil signal when driving of the supplying-end coil is stopped according to the length of oscillation cycle.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
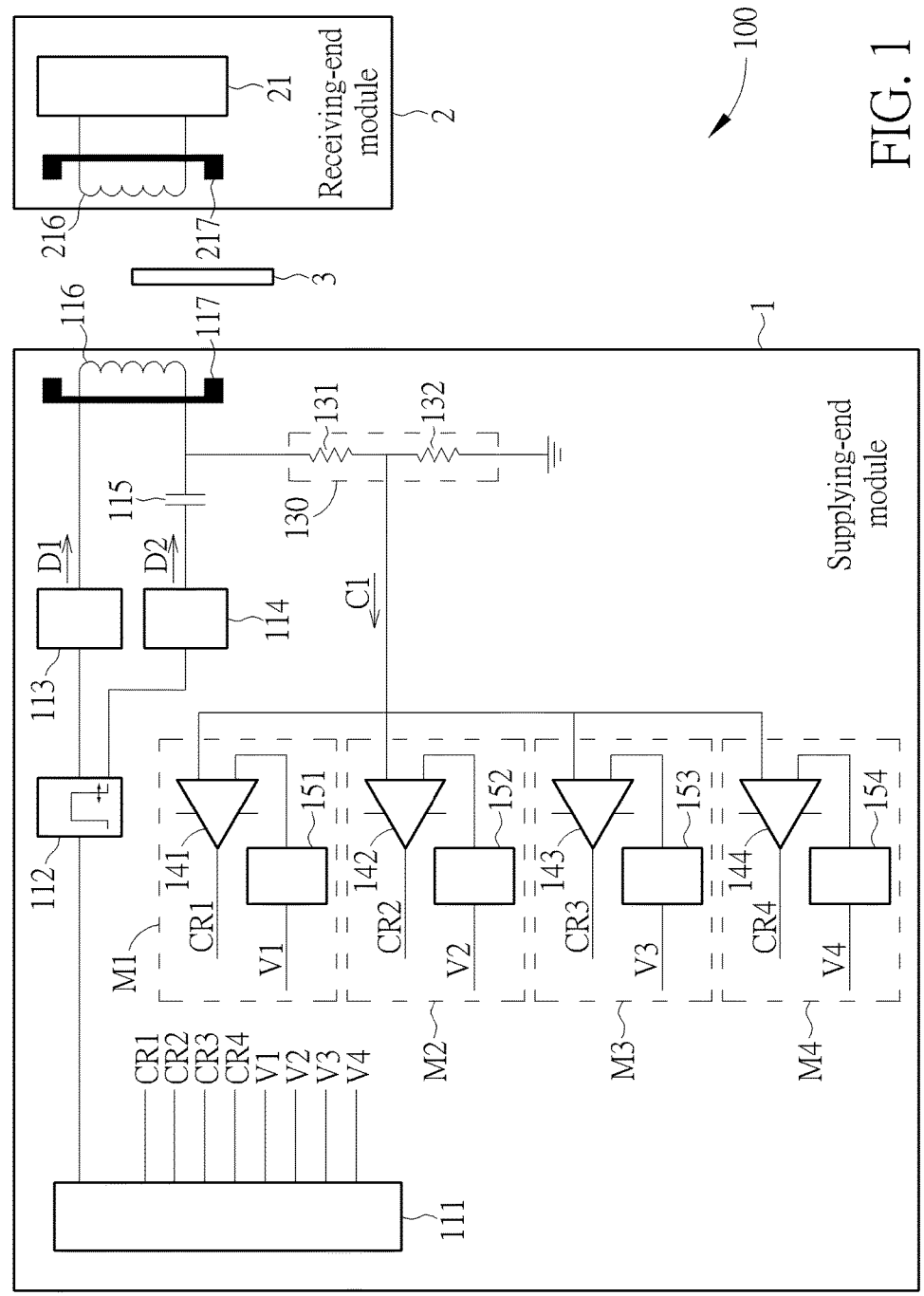
FIG. 1 is a schematic diagram of an induction type power supply system according to an embodiment of the present invention.

Please refer to FIG. 1, which is a schematic diagram of an induction type power supply system 100 according to an embodiment of the present invention. As shown in FIG. 1, the induction type power supply system 100 includes a supplying-end module 1 and a receiving-end module 2. The supplying-end module 1 includes a supplying-end coil 116 and a resonant capacitor 115. The supplying-end coil 116 is used for delivering electromagnetic energies to the receiving-end module 2 to supply power. The resonant capacitor 115, coupled to the supplying-end coil 116, is used for performing resonance together with the supplying-end coil 116. In addition, in the supplying-end module 1, a magnetic conductor 117 composed of magnetic materials may be selectively disposed, to enhance the electromagnetic induction capability of the supplying-end coil 116 and also prevent electromagnetic energies from affecting the objects located in the non-inducting side of the coil.

In order to control the operations of the supplying-end coil 116 and the resonant capacitor 115, the supplying-end module 1 further includes a processor 111, a clock generator 112, power driver units 113 and 114, a voltage dividing circuit 130 and comparator modules M1-M4. The power driver units 113 and 114, coupled to the supplying-end coil 116 and the resonant capacitor 115, are used for sending driving signals D1 and D2 to the supplying-end coil 116. The power driver units 113 and 114 may be controlled by the processor 111, for driving the supplying-end coil 116 to generate and send power. When the power driver units 113 and 114 are both active, full-bridge driving is performed. In another embodiment, only one of the power driver units 113 and 114 is active or only one of the power driver units 113 and 114 is disposed, which leads to half-bridge driving. The clock generator 112, coupled to the power driver units 113 and 114, is used for controlling the power driver units 113 and 114 to send the driving signals D1 and D2 or interrupting the driving signals D1 and D2. The clock generator 112 may be a pulse width modulation (PWM) generator or other type of clock generator, for outputting a clock signal to the power driver units 113 and 114. The processor 111 may receive information related to a coil signal C1 (i.e., the voltage signal between the supplying-end coil 116 and the resonant capacitor 115) from the supplying-end coil 116, and determine whether an intruding metal 3 exists in the power transmission range of the induction type power supply system 100 according to the coil signal C1. The voltage dividing circuit 130, which includes voltage dividing resistors 131 and 132, may attenuate the coil signal C1 on the supplying-end coil 116 and then output the coil signal C1 to the processor 111 and the comparator modules M1-M4. In some embodiments, if the tolerance voltages of the circuits in the processor 111 and the comparator modules M1-M4 are high enough, the voltage dividing circuit 130 may not be applied and the processor 111 may directly receive the coil signal C1 from the supplying-end coil 116. In addition, each of the comparator modules M1-M4 is composed of a comparator and a digital to analog converter (DAC), for tracking peak values of the coil signal C1. Other possible components or modules such as a power supply unit and display unit may be included or not according to system requirements. These components are omitted herein without affecting the illustrations of the present embodiments.

Please keep referring to FIG. 1. The receiving-end module 2 includes a receiving-end coil 216, which is used for receiving power from the supplying-end coil 116. In the receiving-end module 2, a magnetic conductor 217 composed of magnetic materials may also be selectively disposed, to enhance the electromagnetic induction capability of the receiving-end coil 216 and also prevent electromagnetic energies from affecting the objects located in the non-inducting side of the coil. The receiving-end coil 216 may send the received power to a load unit 21 in the back end. Other possible components or modules in the receiving-end module 2 such as a regulator circuit, resonant capacitor, rectification circuit, signal feedback circuit and receiving-end processor may be included or not according to system requirements. These components are omitted herein without affecting the illustrations of the present embodiments.

Figure 2:
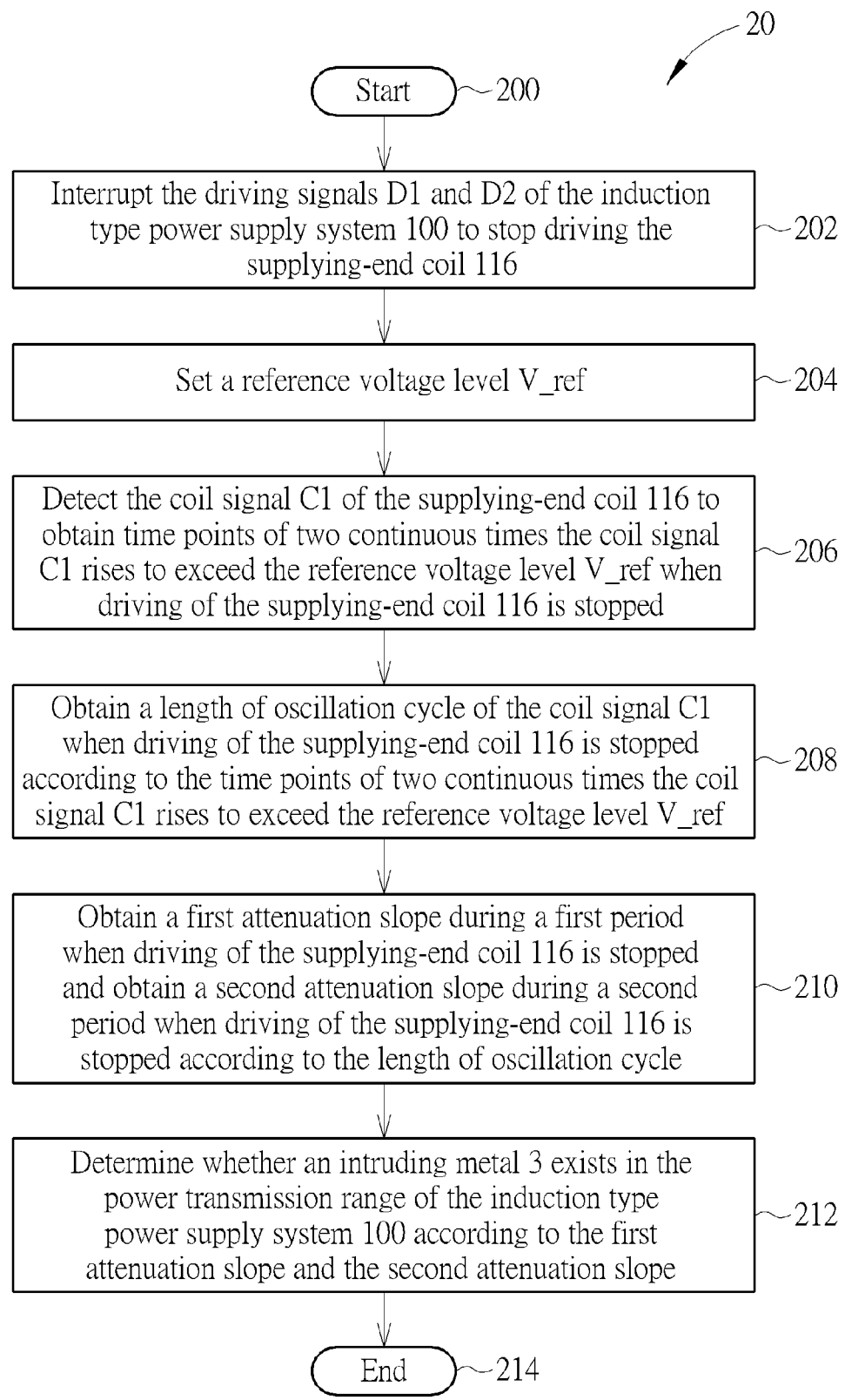
FIG. 2 is a schematic diagram of an intruding metal determination process according to an embodiment of the present invention.

Different from the prior art where both of the power supplying terminal and power receiving terminal have to perform power measurement to determine the intruding metal via power loss detection, the present invention may determine whether there exists an intruding metal in the power transmission region of the supplying-end coil by interpreting the coil signal in the power supplying terminal only. Please refer to FIG. 2, which is a schematic diagram of an intruding metal determination process 20 according to an embodiment of the present invention. As shown in FIG. 2, the intruding metal determination process 20, which is used for a power supplying terminal of an induction type power supply system (e.g., the supplying-end module 1 of the induction type power supply system 100 shown in FIG. 1), includes the following steps:

Step 200: Start.
Step 202: Interrupt the driving signals D1 and D2 of the induction type power supply system 100 to stop driving the supplying-end coil 116.
Step 204: Set a reference voltage level V_ref.
Step 206: Detect the coil signal C1 of the supplying-end coil 116 to obtain time points of two continuous times the coil signal C1 rises to exceed the reference voltage level V_ref when driving of the supplying-end coil 116 is stopped.
Step 208: Obtain a length of oscillation cycle of the coil signal C1 when driving of the supplying-end coil 116 is stopped according to the time points of two continuous times the coil signal C1 rises to exceed the reference voltage level V_ref.
Step 210: Obtain a first attenuation slope during a first period when driving of the supplying-end coil 116 is stopped and obtain a second attenuation slope during a second period when driving of the supplying-end coil 116 is stopped according to the length of oscillation cycle.
Step 212: Determine whether an intruding metal 3 exists in the power transmission range of the induction type power supply system 100 according to the first attenuation slope and the second attenuation slope.
Step 214: End.

Figure 3:
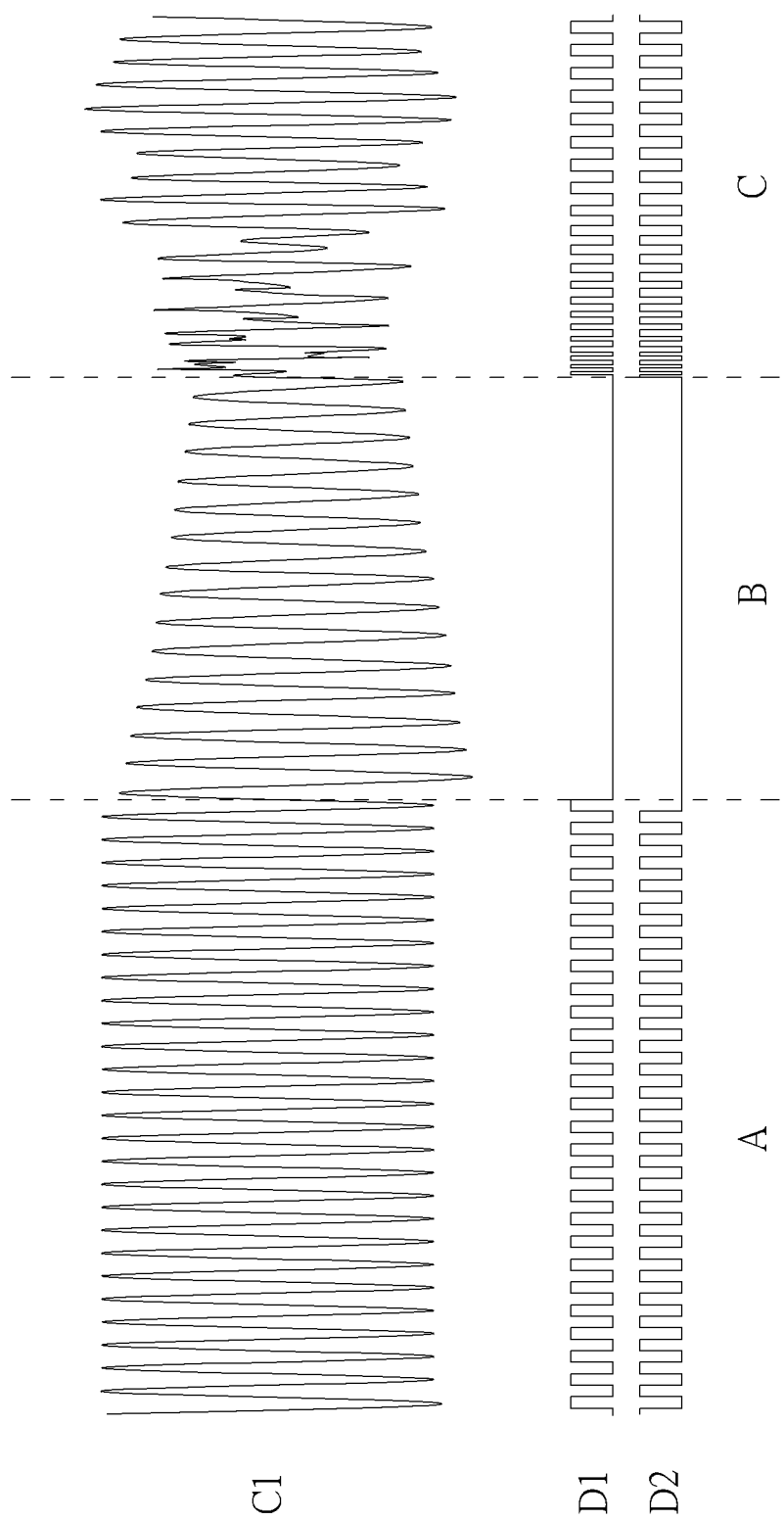
FIG. 3 is a waveform diagram of operations of the coil signal of the induction type power supply system according to an embodiment of the present invention.

According to the intruding metal determine process 20, in the supplying-end module 1 of the induction type power supply system 100, the driving operations of the driving signals D1 and D2 may be interrupted for a period of time. At this moment, the power driver units 113 and 114 may stop driving the supplying-end coil 116 (Step 202). In general, when the supplying-end coil 116 is driven normally, the driving signals D1 and D2 outputted by the power driver units 113 and 114 are inverse rectangular waves. In such a situation, the coil signal C1 of the supplying-end coil 116 may appear to oscillate stably, where the oscillation frequency is equal to the frequency of the driving signals D1 and D2, as shown in the time period A of FIG. 3. The oscillation frequency may be controlled by the processor 111 or the clock generator 112 via the driving signals D1 and D2. When driving of the supplying-end coil 116 is stopped, the coil signal C1 may keep oscillating and attenuate due to the energies remaining in the supplying-end coil 116 and the resonant capacitor 115. The time period B shown in FIG. 3 illustrates the oscillation and attenuation of the coil signal C1. When the driving signals D1 and D2 are interrupted, the driving signals D1 and D2, which is originally rectangular waves, simultaneously stay in a low voltage level and stop driving the supplying-end coil 116. At this moment, the coil signal C1 starts to attenuate and keep oscillating, where the oscillation frequency may be determined by the inductance L and the capacitance C generated from cooperation of the supplying-end coil 116 and the resonant capacitor 115, i.e., $$f_0 = \frac{1}{2\pi\sqrt{LC}}$$

Subsequently, the reference voltage level V_ref is set (Step 204). For example, the reference voltage level V_ref may be preset in the system or set by the processor 111. When driving of the supplying-end coil 116 is stopped, the processor 111 may detect the coil signal C1 of the supplying-end coil 116 to obtain the time points of two continuous times the coil signal C1 rises to exceed the reference voltage level V_ref (Step 206). In general, the reference voltage level V_ref may be set to be equal to or near the zero voltage level. Furthermore, the processor 111 may obtain the length of oscillation cycle of the coil signal C1 when driving of the supplying-end coil 116 is stopped according to the time points of two continuous times the coil signal C1 rises to exceed the reference voltage level V_ref (Step 208). That is, when the reference voltage level V_ref approaches to a middle voltage of the coil signal C1 (i.e., near the zero voltage level), the period between the time points of two continuous times the coil signal C1 rises to exceed the reference voltage level V_ref may be equal to the length of oscillation cycle of the coil signal C1. According to the length of oscillation cycle, the processor 111 may obtain a first attenuation slope during a first period when driving of the supplying-end coil 116 is stopped, and obtain a second attenuation slope during a second period when driving of the supplying-end coil 116 is stopped (Step 210), wherein the second period is later than the first period. The processor 111 then determines whether there exists an intruding metal 3 in the power transmission range of the induction type power supply system 100 according to the first attenuation slope and the second attenuation slope (Step 212). Subsequently, as shown in the time period C of FIG. 3, the driving signals D1 and D2 restart with a moving phase or variable frequency, in order to prevent the amplitude of the coil signal C1 from bursting instantly to burn out the circuit elements.

Please note that if there is no intruding metal in the power transmission range of the induction type power supply system 100, the coil signal C1 may attenuate naturally and keep oscillating when driving of the driving signals D1 and D2 is interrupted, where the attenuation slope of the coil signal C1 may remain fixed. On the other hand, if there is an intruding metal in the power transmission range of the induction type power supply system 100, the coil signal C1 may also attenuate when driving of the driving signals D1 and D2 is interrupted, but the attenuation behavior is different from the former case. In detail, when the intruding metal exists in the power transmission range, the coil signal C1 may attenuate in a larger slope first, and the attenuation slope may gradually decrease.

In order to obtain the attenuation slope of the coil signal C1, the peak locations and peak values of the coil signal C1 should be obtained in advance, to determine the attenuation of peak values. During a period when the supplying-end coil 116 is driven normally (as the time period A shown in FIG. 3), the cycle and frequency of the coil signal C1 may be controlled via the driving signals D1 and D2; that is, the cycle of the coil signal C1 may be synchronous to the driving signals D1 and D2. In such a condition, the processor 111 may obtain the peak locations of the coil signal C1 in each coil driving cycle. The detailed operations are narrated in U.S. application Ser. No. 15/197,796. However, during a period when driving of the supplying-end coil 116 is stopped (as the time period B shown in FIG. 3), the self-resonant cycle and frequency of the coil signal C1 are determined by the coil inductance and resonant capacitance. In general, the resonant capacitor 115 applied in the supplying-end module 1 may always possess certain errors and may not have accurate capacitance. In addition, the inductance of the supplying-end coil 116 may also possess certain errors, and the inductance actually incorporated to generate the oscillations on the coil may vary due to influences of various factors such as the magnetic conductor 117, intruding metal or loading. In such a condition, it is hard to obtain the practical oscillation frequency of the coil signal C1 via theoretical calculations. Therefore, the present invention obtains the time points of two continuous times the coil signal C1 rises to exceed the reference voltage level V_ref according to the setting of the reference voltage level V_ref, and obtains the length of oscillation cycle of the coil signal C1 accordingly.

Figure 4:
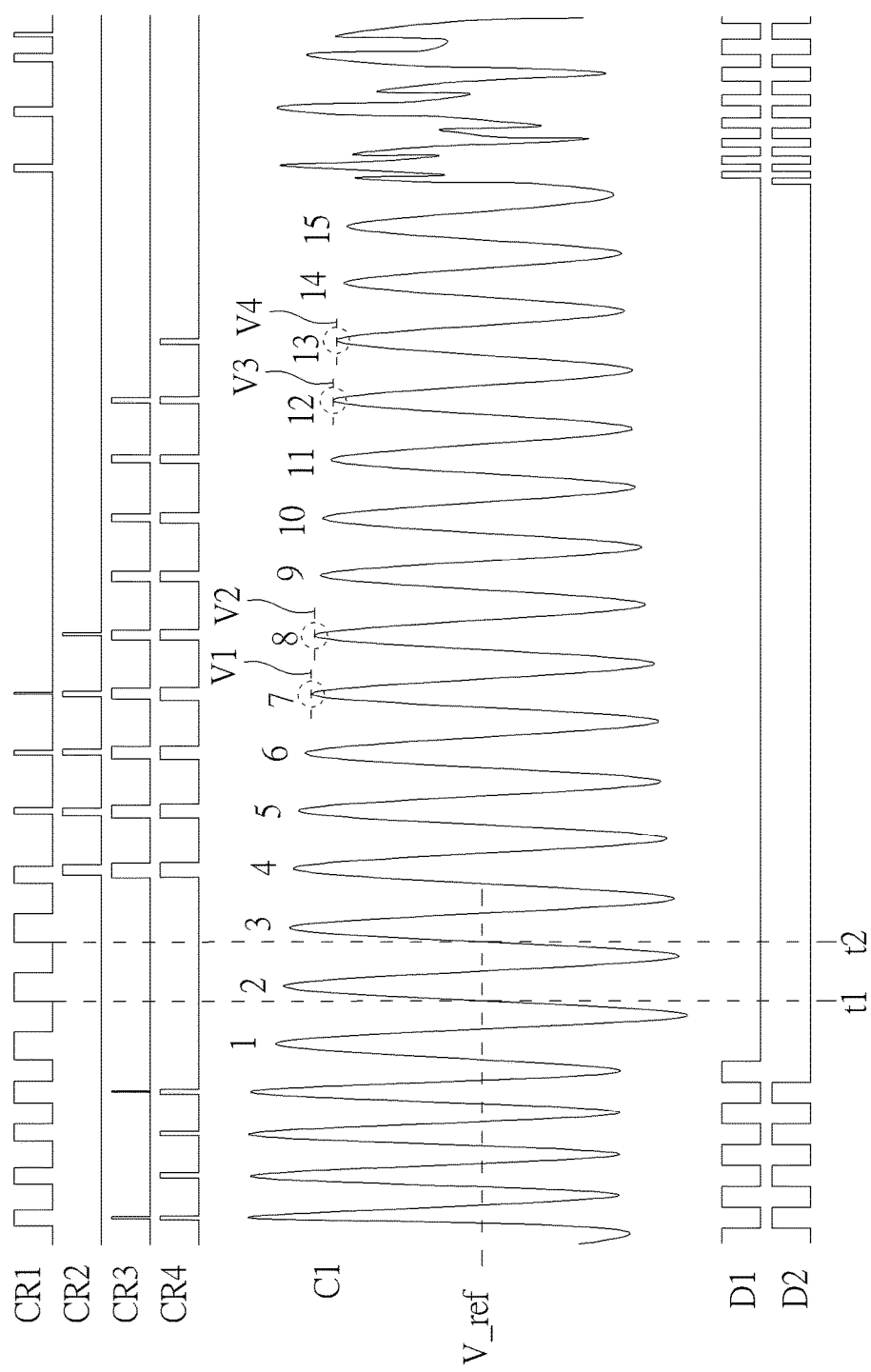
FIG. 4 is a waveform diagram of the attenuation slope of the coil signal determined when driving of the supplying-end coil is stopped according to an embodiment of the present invention.

Please refer to FIG. 4, which is a waveform diagram of the attenuation slope of the coil signal C1 determined when driving of the supplying-end coil 116 is stopped according to an embodiment of the present invention. FIG. 4 illustrates the coil signal C1, the driving signals D1 and D2 and comparison results CR1-CR4. The comparison results CR1-CR4 are output signals of the comparator modules M1-M4 shown in FIG. 1, respectively. When driving of the supplying-end coil 116 is stopped, the driving signals D1 and D2 stay in the low voltage level. At this moment, the processor 111 first obtains the time points of two continuous times the coil signal C1 rises to exceed the reference voltage level V_ref via the comparator module M1. As mentioned above, the reference voltage level V_ref is preferably set to be near the zero voltage level. This is because the coil signal C1 is an alternating current (AC) signal and may oscillate up and down between positive voltages and negative voltages. When the reference voltage level V_ref is equal to zero, the coil signal C1 inevitably passes through the reference voltage level V_ref. The comparator module M1 includes a comparator 141 and a DAC 151. In detail, the processor 111 may output the reference voltage level V_ref to the DAC 151, and the DAC 151 then converts the digital value of the reference voltage level V_ref into an analog voltage. The comparator 141 then compares the analog voltage of the reference voltage level V_ref with the coil signal C1. Therefore, the comparator 141 may output a rectangular wave signal to the processor 111, and the rising edges of the rectangular wave signal may correspond to the time points of the coil signal C1 rising to exceed the reference voltage level V_ref. More specifically, during a first resonance cycle, the processor 111 may start a timer at the time point of the coil signal C1 rising to exceed the reference voltage level V_ref (e.g., the time point t1 shown in FIG. 4). Subsequently, during a second resonance cycle next to the first resonance cycle, the processor 111 may stop the timer at the time point of the coil signal C1 rising to exceed the reference voltage level V_ref (e.g., the time point t2 shown in FIG. 4). As a result, the elapsed time of the timer may be set as the length of oscillation cycle of the coil signal C1. Please note that, those skilled in the art should realize that the above method of obtaining the frequency of the coil signal C1 via the comparator module M1 is only one of various implementations of the present invention. In another embodiment, the length of oscillation cycle of the coil signal C1 may be detected via the comparator module M2, M3 or M4.

After obtaining the length of oscillation cycle of the coil signal C1, the processor 111 may further obtain the peak location in each resonance cycle according to the above determination result of the comparator module M1, and set peak voltage levels V1-V4 to track the voltages of the peak values. As shown in FIG. 4, when driving of the supplying-end coil 116 is stopped, the coil signal C1 may attenuate naturally and keep oscillating. Therefore, the comparator modules M1-M4 may track peak values in four different locations, respectively.

In detail, in the supplying-end module 1 of the induction type power supply system 100, the driving signals D1 and D2 may be interrupted at regular intervals. The interrupt period may be equal to a predetermined value. Take FIG. 4 as an example, the length of the interrupt period of the driving signals D1 and D2 approximately allows the coil signal C1 to naturally oscillate 15 cycles. Preferably, after the driving signals D1 and D2 are interrupted and stop driving the supplying-end coil 116, the processor 111 may obtain the time point of the coil signal C1 rising to exceed the reference voltage level V_ref during the $2^{nd}$ to the $3^{rd}$ oscillation cycles, in order to obtain the length of oscillation cycle of the coil signal C1 and calculate the peak locations in each subsequent cycle. In another embodiment, the determination of cycle length may be performed in other oscillation cycles. Subsequently, during the period when driving of the supplying-end coil 116 is stopped, the comparator modules M1-M4 may retrieve a plurality of peak values of oscillation on the coil signal C1 of the supplying-end coil 116, and compare the plurality of peak values respectively with a corresponding peak voltage level among and a plurality of peak voltage levels generated in the previous time driving of the supplying-end coil 116 is stopped. Each of the comparator modules M1-M4, which may correspond to a peak value and a peak voltage level, is used for comparing the corresponding peak value with the corresponding peak voltage level. Therefore, the number of peak voltage levels used for performing determination may be equal to the number of comparator modules, and also equal to the number of peak values retrieved by the comparator modules, where the peak voltage levels track voltages of the corresponding peak values, respectively. In this embodiment, the comparator modules M1-M4 may retrieve four peak values and applies four peak voltage levels V1-V4 to track them.

Please keep referring to FIG. 4. After the processor 111 obtains the length of oscillation cycle and peak locations of the coil signal C1, the comparator modules M1-M4 may respectively retrieve the peak values in the $7^{th}$, $8^{th}$, $12^{th}$ and $13^{th}$ oscillation cycles after driving of the coil signal C1 is stopped, as shown in FIG. 4. The processor 111 may send the peak voltage levels V1-V4, which is updated in the previous time driving of the supplying-end coil 116 is interrupted, to the comparator modules M1-M4, respectively, allowing the comparator modules M1-M4 to perform comparison. In detail, the comparator module M1, which is used for comparing the coil signal C1 with the reference voltage level V_ref in the previous stage, is now used for comparing the peak voltage level V1 with the $7^{th}$ peak value of the coil signal C1. In detail, the DAC 151 may receive the digital value of the peak voltage level V1 from the processor 111, and then convert the digital value into an analog voltage. The comparator 141 then compares the analog voltage of the peak voltage level V1 with the coil signal C1 and outputs the comparison result CR1. Subsequently, the processor 111 may determine whether the $7^{th}$ peak value of the coil signal C1 reaches the peak voltage level V1 according to the comparison result CR1. When the peak value reaches the peak voltage level V1, the processor 111 may increase the value of the peak voltage level V1; and when the peak value fails to reach the peak voltage level V1, the processor 111 may decrease the value of the peak voltage level V1. As a result, the peak voltage level V1 may keep tracking the voltage of the $7^{th}$ peak value after driving of the coil signal C1 is stopped.

Similarly, the comparator module M2 is used for comparing the peak voltage level V2 with the $8^{th}$ peak value of the coil signal C1. The comparator module M2 includes a comparator 142 and a DAC 152. The DAC 152 may receive the digital value of the peak voltage level V2 from the processor 111, and then convert the digital value into an analog voltage. The comparator 142 then compares the analog voltage of the peak voltage level V2 with the coil signal C1 and outputs the comparison result CR2. Subsequently, the processor 111 may determine whether the $8^{th}$ peak value of the coil signal C1 reaches the peak voltage level V2 according to the comparison result CR2. When the peak value reaches the peak voltage level V2, the processor 111 may increase the value of the peak voltage level V2; and when the peak value fails to reach the peak voltage level V2, the processor 111 may decrease the value of the peak voltage level V2. As a result, the peak voltage level V2 may keep tracking the voltage of the $8^{th}$ peak value after driving of the coil signal C1 is stopped. The comparator module M3 is used for comparing the peak voltage level V3 with the $12^{th}$ peak value of the coil signal C1. The comparator module M3 includes a comparator 143 and a DAC 153. The DAC 153 may receive the digital value of the peak voltage level V3 from the processor 111, and then convert the digital value into an analog voltage. The comparator 143 then compares the analog voltage of the peak voltage level V3 with the coil signal C1 and outputs the comparison result CR3. Subsequently, the processor 111 may determine whether the $12^{th}$ peak value of the coil signal C1 reaches the peak voltage level V3 according to the comparison result CR3. When the peak value reaches the peak voltage level V3, the processor 111 may increase the value of the peak voltage level V3; and when the peak value fails to reach the peak voltage level V3, the processor 111 may decrease the value of the peak voltage level V3. As a result, the peak voltage level V3 may keep tracking the voltage of the $12^{th}$ peak value after driving of the coil signal C1 is stopped. The comparator module M4 is used for comparing the peak voltage level V4 with the $13^{th}$ peak value of the coil signal C1. The comparator module M4 includes a comparator 144 and a DAC 154. The DAC 154 may receive the digital value of the peak voltage level V4 from the processor 111, and then convert the digital value into an analog voltage. The comparator 144 then compares the analog voltage of the peak voltage level V4 with the coil signal C1 and outputs the comparison result CR4. Subsequently, the processor 111 may determine whether the $13^{th}$ peak value of the coil signal C1 reaches the peak voltage level V4 according to the comparison result CR4. When the peak value reaches the peak voltage level V4, the processor 111 may increase the value of the peak voltage level V4; and when the peak value fails to reach the peak voltage level V4, the processor 111 may decrease the value of the peak voltage level V4. As a result, the peak voltage level V4 may keep tracking the voltage of the $13^{th}$ peak value after driving of the coil signal C1 is stopped.

During the above process of determining peak values, the peak voltage levels V1-V4 after updated may be stored in a buffer of the processor 111, to be used for the next determination. As a result, each time when driving of the supplying-end coil 116 is stopped, the processor 111 may update the peak voltage levels V1-V4 according to the comparison results CR1-CR4, allowing the peak voltage levels V1-V4 to keep tracking the peak voltages of the coil signal C1. Therefore, when all of the peak voltage levels V1-V4 successfully track the corresponding peak voltages, the processor 111 may obtain the attenuation slope of the coil signal C1 via the peak voltage levels V1-V4.

In addition, since the peak voltage levels V1-V4 are used for tracking the peak voltages of the coil signal C1, the peak voltage levels V1-V4 may be regarded as the peak voltages of the coil signal C1 when the peak voltage levels V1-V4 are stable. Therefore, the processor 111 may calculate the first attenuation slope and the second attenuation slope according to the peak voltage levels V1-V4. In detail, the processor 111 may divide the difference of the peak voltage level V1 and the peak voltage level V2 by the distance between the $7^{th}$ peak and the $8^{th}$ peak (i.e., the length of one oscillation cycle of the coil signal C1) to calculate the first attenuation slope. The processor ill may divide the difference of the peak voltage level V3 and the peak voltage level V4 by the distance between the $12^{th}$ peak and the $13^{th}$ peak (i.e., the length of one oscillation cycle of the coil signal C1) to calculate the second attenuation slope. As mentioned above, when driving of the supplying-end coil 116 is stopped, the coil signal C1 may possess different attenuation behaviors in the condition where there exists an intruding metal or there is no intruding metal. When there is no intruding metal, the attenuation slope of the coil signal C1 may remain fixed; and when an intruding metal exists, the coil signal C1 may first attenuate in a larger slope, and the attenuation slope gradually decreases. During the above process of determining the peak values, the processor 111 may obtain the $7^{th}$ and $8^{th}$ peak values during the earlier period of attenuation of the coil signal C1 in order to obtain the first attenuation slope, and obtain the $12^{th}$ and $13^{th}$ peak values during the latter period of attenuation of the coil signal C1 in order to obtain the second attenuation slope. In an embodiment, an accumulator of intruding metal determination may be applied as an indication for determining the intruding metal. When the value of the first attenuation slope (which is in the earlier period of attenuation) minus the second attenuation slope (which is in the latter period of attenuation) is greater than a first threshold value (i.e., the attenuation slope in the earlier period is larger), the processor 111 may determine that there may exist an intruding metal and increase the value of the accumulator of intruding metal determination.

In contrast, when the value of the first attenuation slope in the earlier period of attenuation minus the second attenuation slope in the latter period of attenuation is smaller than the first threshold value (i.e., the attenuation slope almost remains constant), the processor 111 may determine that there may be no intruding metal and decrease the value of the accumulator of intruding metal determination. Furthermore, when the value of the accumulator of intruding metal determination is continuously accumulated to exceed a second threshold value, the processor 111 determines that an intruding metal exists in the power transmission range of the induction type power supply system 100, and thereby performs power cut or other protective practices.

As shown in FIG. 4, when driving of the supplying-end coil 116 is stopped (i.e., the driving signals D1 and D2 are interrupted), the coil signal C1 attenuate naturally in a fixed slope, which means that no intruding metal exists.

Figure 5:
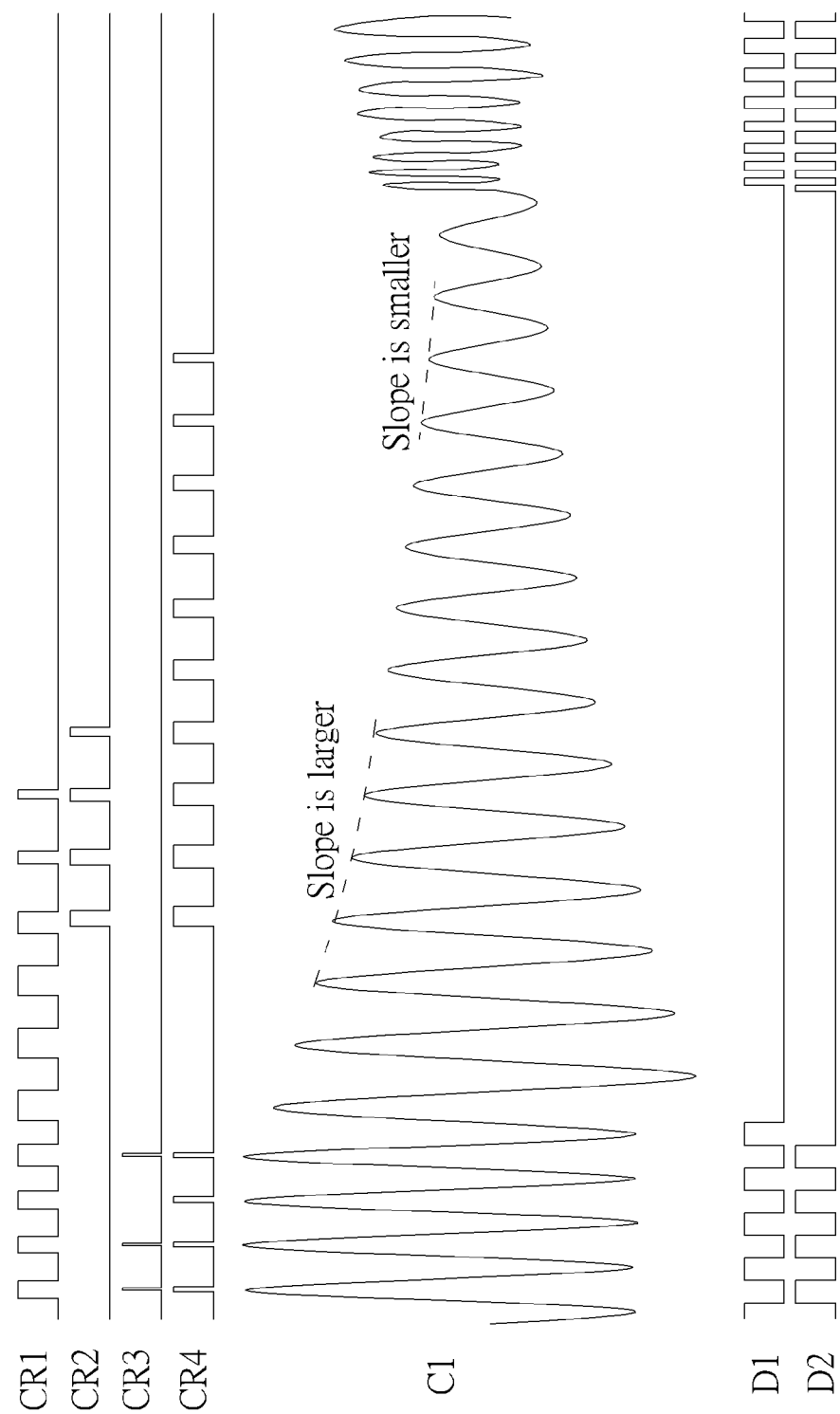
FIG. 5 is a waveform diagram of the attenuation slope of the coil signal determined when driving of the supplying-end coil is stopped where an intruding metal exists according to an embodiment of the present invention.

Please refer to FIG. 5, which is a waveform diagram of the attenuation slope of the coil signal C1 determined when driving of the supplying-end coil 116 is stopped where an intruding metal exists according to an embodiment of the present invention. Similarly, FIG. 5 also includes the coil signal C1, the driving signals D1 and D2 and the comparison results CR1-CR4. As shown in the waveform of the coil signal C1 in FIG. 5, the coil signal C1 attenuates in a larger slope first, and the attenuation slope decreases gradually, which means that there exists an intruding metal. Please note that the existence of intruding metal may affect the oscillation frequency of the coil signal C1; hence, each time when driving of the supplying-end coil 116 is stopped, the time points of two continuous times the coil signal C1 rises to exceed the reference voltage level V_ref should be determined, in order to obtain the length of oscillation cycle in that period when driving of the supplying-end coil 116 is stopped. Since the period of interrupting driving of the supplying-end coil 116 is quite short, the oscillation frequency of the supplying-end coil 116 is considered constant without any variations during the short period.

Figure 6:
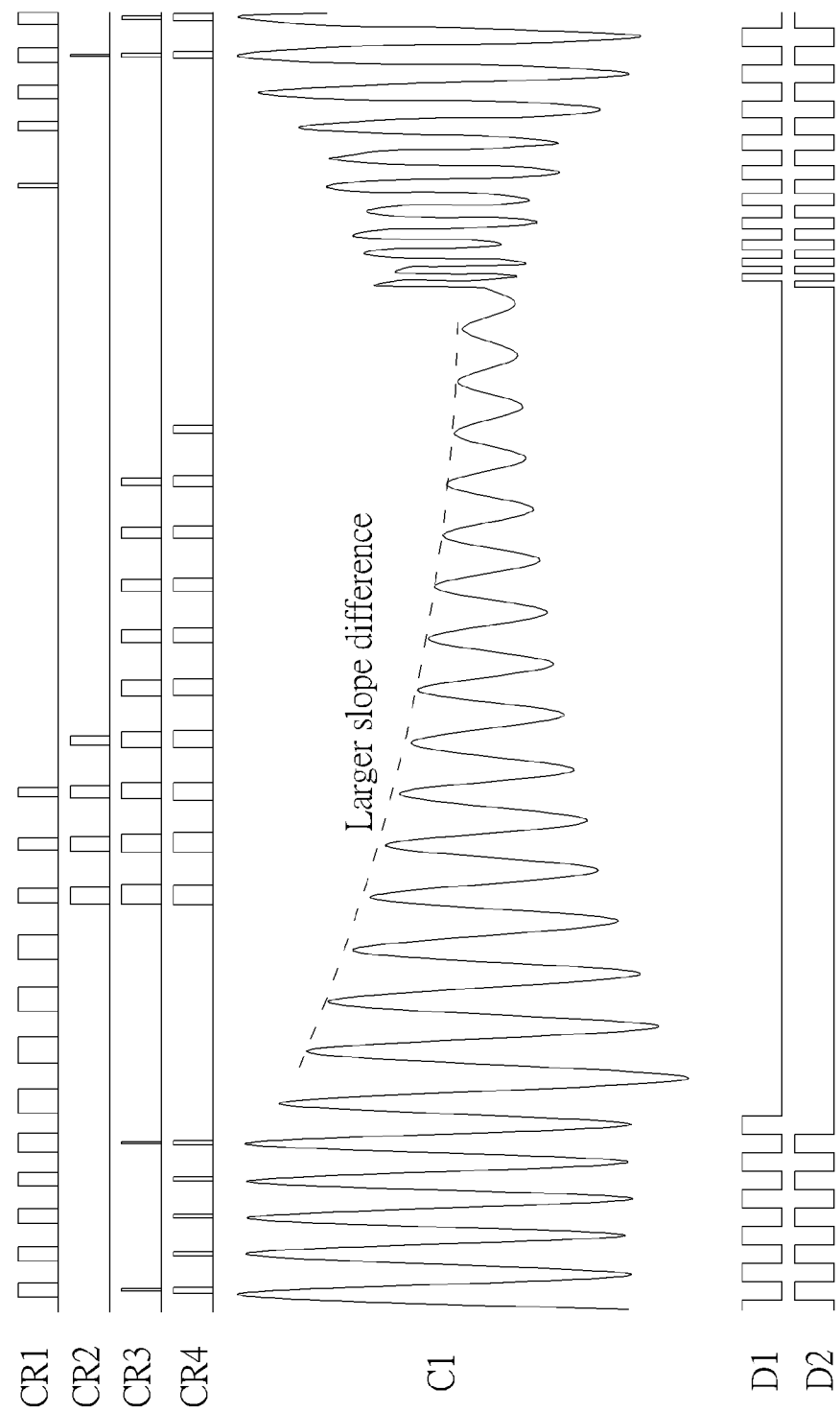
FIG. 6 is a waveform diagram of the attenuation slope of the coil signal determined when driving of the supplying-end coil is stopped where a large intruding metal exists according to an embodiment of the present invention.

Please refer to FIG. 6, which is a waveform diagram of the attenuation slope of the coil signal C1 determined when driving of the supplying-end coil 116 is stopped where a large intruding metal exists according to an embodiment of the present invention. Similarly, FIG. 6 also includes the coil signal C1, the driving signals D1 and D2 and the comparison results CR1-CR4. FIG. 6 illustrates a situation where a large intruding metal exists in the power transmission range of the induction type power supply system 100. As shown in the waveform of the coil signal C1 in FIG. 6, the coil signal C1 attenuates in a larger slope first, and the attenuation slope decreases rapidly. In comparison with the embodiment shown in FIG. 5, the first attenuation slope and the second attenuation slope have a larger difference in the embodiment shown in FIG. 6, which means that there is a larger intruding metal existing in the power transmission range of the induction type power supply system 100; this is a more dangerous case.

In an embodiment, the abovementioned value of the accumulator of intruding metal determination may be adjusted according to the difference amount between the first attenuation slope and the second attenuation slope. In other words, if the value of the first attenuation slope minus the second attenuation slope is larger, the processor 111 may increase the value of the accumulator of intruding metal determination with a larger amount; and if the value of the first attenuation slope minus the second attenuation slope is smaller but still exceeds the first threshold value, the processor 111 may increase the value of the accumulator of intruding metal determination with a smaller amount. In this manner, the larger intruding metal having higher danger may let the accumulator of intruding metal determination to rapidly reach the second threshold value, in order to rapidly terminate the power supply of the induction type power supply system 100. In addition, a noise slightly affecting the attenuation slope may not significantly change the value of the accumulator of intruding metal determination and cause erroneous power cut.

Please note that the present invention tracks the voltage of the peak values by using the peak voltage levels and uses the peak voltage levels to obtain the attenuation slope of the coil signal, in order to determine the attenuation behavior of the coil signal and thereby determine whether there exists an intruding metal in the power transmission range of the induction type power supply system. In such a condition, the peak locations should be accurately determined, in order to retrieve the peak values. However, the oscillation speed of the coil signal is extremely fast, and the oscillation is accompanied by attenuation. In the condition where the driving signal is interrupted, the oscillation frequency of the coil signal is usually different from the frequency of the driving signal and may not be controlled by the processor. Therefore, with the high-speed oscillation of the coil signal, the sampling speed of a general analog to digital converter (ADC) is not fast enough and the existence of sampling time may cause that the peak value of the coil signal is hard to be retrieved accurately. In such a situation, the present invention tracks the coil signal via the comparator modules and adjust the values of the peak voltage levels according to whether the coil signal exceeds the peak voltage levels, so that the peak voltage levels keep tracking specific peak values of the coil signal and the peak voltage levels are finely tuned according to the comparison results of the comparator modules. As a result, the present invention may effectively determine the attenuation behavior of the coil signal according to the peak voltage levels, in order to determine whether there exists an intruding metal in the power transmission range of the induction type power supply system.

Furthermore, since a peak voltage level is not a practical peak voltage on a peak, the peak voltage level may not be equal to the peak value in several conditions, especially when a load variation occurs in the induction type power supply system or an interference of intruding metal appears and causes the coil signal to be unstable. In detail, when the coil signal is unstable, a peak voltage of the coil signal may rise immediately, such that the corresponding peak voltage level may be smaller than the peak voltage and these two voltages are separate with a specific interval. At this moment, the peak voltage level should rise by more times, in order to keep up with the value of the peak voltage. In such a condition, in continuous multiple periods of interrupting driving of the supplying-end coil, the peak value may reach the corresponding peak voltage level (i.e., the comparison result indicates a trigger); hence, the peak voltage level should rise continuously and the peak voltage may not be obtained accurately during the rising period of the peak voltage level. Therefore, the abovementioned step of determining the intruding metal according to the attenuation slope may be stopped temporarily. Similarly, when the coil signal is unstable, a peak voltage of the coil signal may fall immediately, such that the corresponding peak voltage level may be greater than the peak voltage and these two voltages are separate with a specific interval. At this moment, the peak voltage level should fall by more times, in order to keep up with the value of the peak voltage. In such a condition, in continuous multiple periods of interrupting driving of the supplying-end coil, the peak value may fail to reach the corresponding peak voltage level (i.e., the comparison result indicates no trigger); hence, the peak voltage level should fall continuously and the peak voltage may not be obtained accurately during the falling period of the peak voltage level. Therefore, the abovementioned step of determining the intruding metal according to the attenuation slope may be stopped temporarily. On the other hand, when the coil signal is stable, the peak voltage levels may successfully track the corresponding peak values, and the peak voltage levels are tuned up and down based on the comparison results of the comparator modules. At this moment, the comparison results of every peak voltage level may appear several trigger signals and several non-trigger signals alternately, which means that the coil signal is in a stable status and the peak voltage levels may stand for the peak voltages on the peak. In such a condition, the first attenuation slope and the second attenuation slope may be obtained according to the peak voltage levels, in order to perform the abovementioned step of determining the intruding metal according to the attenuation slope.

In an embodiment, a plurality of stability parameters may be set for determining whether the coil signal of the supplying-end coil is in a stable status, where each stability parameter may correspond to a peak voltage level and the larger the stability parameter indicates the more stable coil signal. The processor may perform determination based on the stability parameter and the corresponding peak voltage level and peak value during a period of time, to determine a maximum continuous trigger count and a maximum continuous non-trigger count, where the maximum continuous trigger count refers to a maximum number of times a peak value continuously reaches the corresponding peak voltage level, and the maximum continuous non-trigger count refers to a maximum number of times a peak value continuously fails to reach the corresponding peak voltage level. As mentioned above, if the maximum continuous trigger count or the maximum continuous non-trigger count is larger, the peak voltage level may rise or fall continuously and may not keep up with the peak voltage. If the maximum continuous trigger count and the maximum continuous non-trigger count are smaller, the peak voltage level may stay around and keep tracking the corresponding peak value. In such a situation, the processor may increase the stability parameter when both of the maximum continuous trigger count and the maximum continuous non-trigger count are smaller than a predetermined value, or decrease the stability parameter when the maximum continuous trigger count or the maximum continuous non-trigger count is greater than the predetermined value. As a result, if the plurality of stability parameters are greater than a threshold value, all peak voltage levels may successfully track the corresponding peak values. At this moment, the processor may further calculate the first attenuation slope and the second attenuation slope of the coil signal, in order to determine whether there exists an intruding metal in the power transmission range of the induction type power supply system. If any one of the plurality of stability parameter is smaller than the threshold value, there may be at least one peak voltage level not keeping up with the corresponding peak value yet. At this moment, the processor may stop performing the above determination step of intruding metal.

In order to increase the speed for the peak voltage level to track the peak value, the continuous trigger count or the continuous non-trigger count in the latest several comparison results may be determined. If multiple continuous comparison results indicate a trigger and the number of continuous trigger signals is greater than a predetermined number, the peak voltage of the coil signal may be far greater than the peak voltage level. At this moment, the processor may accelerate the speed of increasing the peak voltage level, allowing the peak voltage level to keep up with the peak voltage more rapidly. Similarly, if multiple continuous comparison results indicate no trigger and the number of continuous non-trigger signals is greater than a predetermined number, the peak voltage of the coil signal may be far smaller than the peak voltage level. At this moment, the processor may accelerate the speed of decreasing the peak voltage level, allowing the peak voltage level to keep up with the peak voltage more rapidly.

Those skilled in the art should realize that the above implementation of applying four comparator modules M1-M4 and the peak voltage levels V1-V4 to respectively track the peak voltages in the $7^{th}$, $8^{th}$, $12^{th}$ and $13^{th}$ oscillation cycle of the coil signal C1 when driving of the supplying-end coil 116 is stopped is only one of various implementations of the present invention. In another embodiment, other peak values may be retrieved to calculate the first attenuation slope and the second attenuation slope. For example, the peak values in the $4^{th}$ and $6^{th}$ oscillation cycles may be applied to calculate the first attenuation slope in the earlier period of attenuation of the supplying-end coil, and the peak values in the $12^{th}$ and $14^{th}$ oscillation cycles may be applied to calculate the second attenuation slope in the latter period of attenuation of the supplying-end coil, in order to determine the difference between these two attenuation slopes. In a further embodiment, the processor may use only three peak values to calculate the first attenuation slope and the second attenuation slope.

Figure 7:
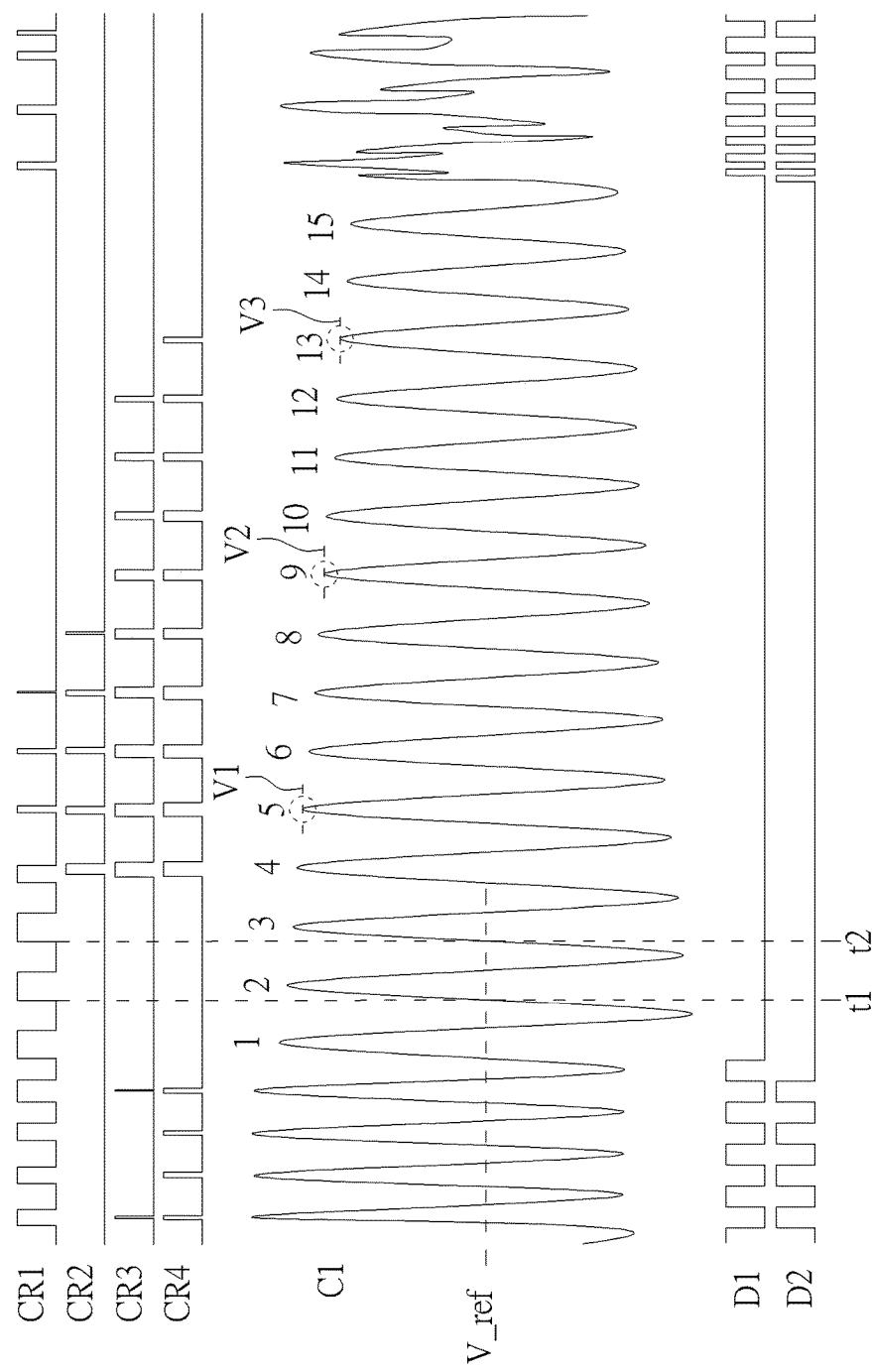
FIG. 7 is a waveform diagram of the attenuation slope of the coil signal determined when driving of the supplying-end coil is stopped according to another embodiment of the present invention.

Please refer to FIG. 7, which is a waveform diagram of the attenuation slope of the coil signal C1 determined when driving of the supplying-end coil 116 is stopped according to another embodiment of the present invention. FIG. 7 illustrates the coil signal C1, the driving signals D1 and D2 and the comparison results CR1-CR3. In this embodiment, there are only three comparison results CR1-CR3, so only three comparator modules (e.g., the comparator modules M1-M3 shown in FIG. 1) are required. When driving of the supplying-end coil 116 is stopped, the processor 111 may obtain five time points of two continuous times the coil signal C1 rises to exceed the reference voltage level V_ref via the comparator module M1. Subsequently, the comparator modules M1-M3 may respectively retrieve the peak values in the $5^{th}$, $9^{th}$ and $13^{th}$ oscillation cycles after driving of the coil signal C1 is stopped. The processor 111 then tracks the peak values by generating the peak voltage levels V1-V3. Therefore, the processor 111 may calculate the first attenuation slope and the second attenuation slope according to the peak voltage levels V1-V3. In detail, the processor 111 may divide the difference of the peak voltage level V1 and the peak voltage level V2 by the distance between the $5^{th}$ peak and the $9^{th}$ peak (i.e., the length of 4 oscillation cycles of the coil signal C1) to calculate the first attenuation slope. The processor 111 may divide the difference of the peak voltage level V2 and the peak voltage level V3 by the distance between the $9^{th}$ peak and the $13^{th}$ peak (i.e., the length of 4 oscillation cycles of the coil signal C1) to calculate the second attenuation slope. In such a condition, the processor 111 may further adjust the value of the accumulator of intruding metal determination according to the difference between the first attenuation slope and the second attenuation slope by the same method, in order to determine whether there exists an intruding metal in the power transmission range of the induction type power supply system 100.

U.S. application Ser. No. 15/197,796 (see FIG. 1 of that application) applies a DAC together with a comparator of a voltage measurement circuit to generate a reference voltage, and applies an operational amplifier to amplify the peak parts of the coil signal according to the reference voltage. Three comparator modules then perform comparison on the amplified peak parts, to determine the reception of modulation signals. On the other hand, the present invention applies multiple comparator modules to track peak voltages of the attenuated coil signal when the driving signal of the supplying-end coil is interrupted, in order to determine the existence of intruding metal according to the attenuation behavior of the coil signal (see FIG. 1 of the present invention). Therefore, U.S. application Ser. No. 15/197,796 and the present invention have a similar circuit structure, which is composed of the same circuit elements. In such a condition, the induction type power supply system and the method of determining the intruding metal of the present invention may be integrated with the induction type power supply system and its related signal analysis method for the modulation signal of U.S. application Ser. No. 15/197,796. In detail, under normal operations of the induction type power supply system, the system may be switched to a normal operation mode to perform the determination of modulation signal by using the signal analysis method and the circuit connections disclosed in U.S. application Ser. No. 15/197,796. In addition, the driving signal may be interrupted for a small period of time at regular intervals. During the interruption periods of the driving signal (i.e., the period where driving of the supplying-end coil is stopped), the system is switched to a metal detection mode, where determination of the intruding metal is performed by using the intruding metal detection method and the circuit connections (as shown in FIG. 1) of the present invention. In general, the processor may control the interruption of driving signal and the reception of modulation signal to be operated in different time, and configure the connections of the circuit elements to switch between the normal operation mode and the metal detection mode.

Figure 8:
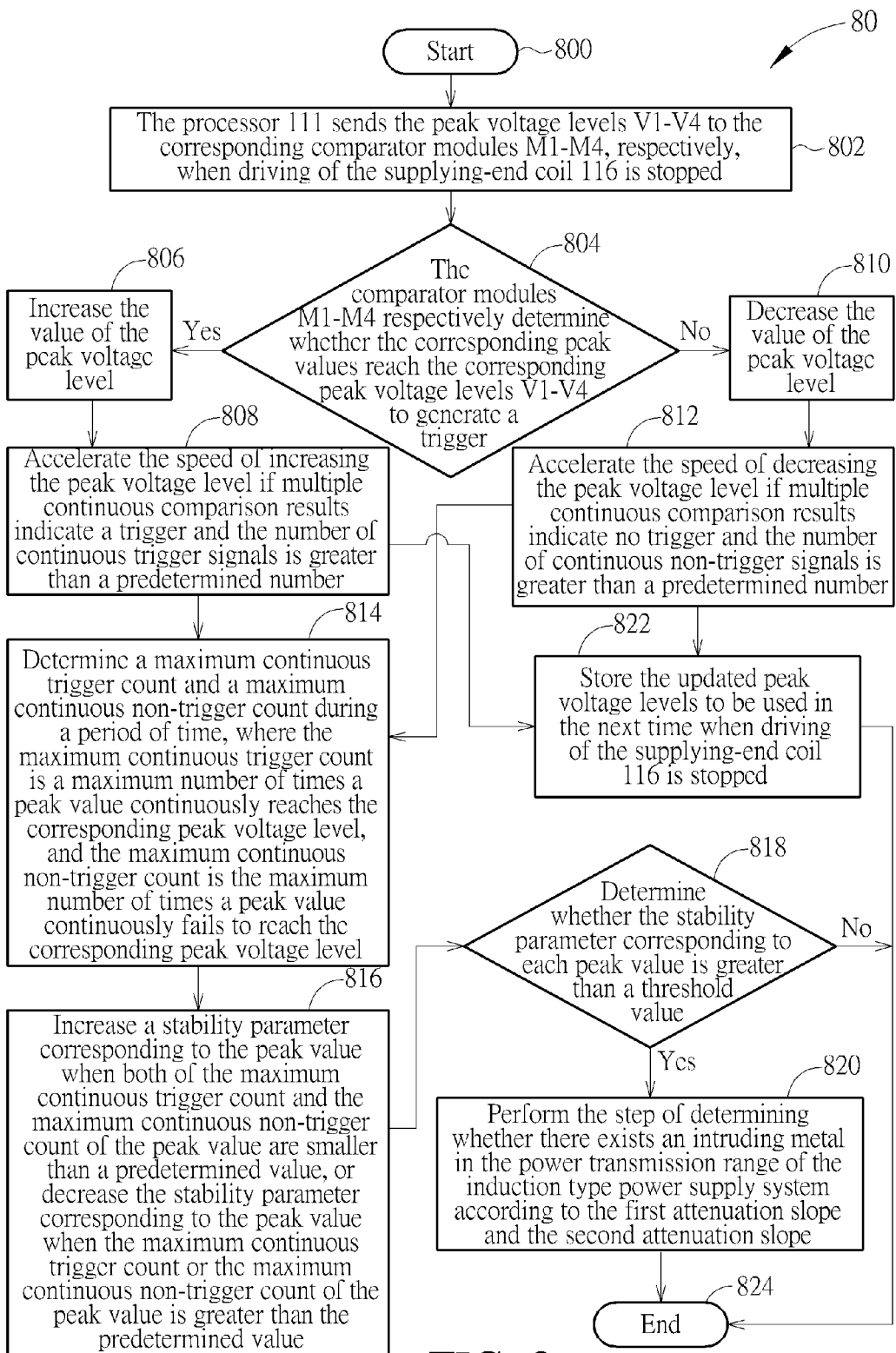
FIG. 8 is a flowchart of a peak voltage determination process according to an embodiment of the present invention.

The abovementioned method of interrupting the driving signal of the induction type power supply system and comparing the peak voltage levels with the peak voltages of the coil signal via the comparator modules allowing the peak voltage levels to track the peak voltages in order to determine whether the peak voltages are stable may be summarized into a peak voltage determination process 80, as shown in FIG. 8. The peak voltage determination process 80, which may be used in the supplying-end module 1 of the induction type power supply system 100, includes the following steps:

Step 800: Start.

Step 802: The processor 111 sends the peak voltage levels V1-V4 to the corresponding comparator modules M1-M4, respectively, when driving of the supplying-end coil 116 is stopped.

Step 804: The comparator modules M1-M4 respectively determine whether the corresponding peak values reach the corresponding peak voltage levels V1-V4 to generate a trigger. If yes, go to Step 806; otherwise, go to Step 810.

Step 806: Increase the value of the peak voltage level.

Step 808: Accelerate the speed of increasing the peak voltage level if multiple continuous comparison results indicate a trigger and the number of continuous trigger signals is greater than a predetermined number.

Step 810: Decrease the value of the peak voltage level.

Step 812: Accelerate the speed of decreasing the peak voltage level if multiple continuous comparison results indicate no trigger and the number of continuous non-trigger signals is greater than a predetermined number.

Step 814: Determine a maximum continuous trigger count and a maximum continuous non-trigger count during a period of time, where the maximum continuous trigger count is a maximum number of times a peak value continuously reaches the corresponding peak voltage level, and the maximum continuous non-trigger count is the maximum number of times a peak value continuously fails to reach the corresponding peak voltage level.

Step 816: Increase a stability parameter corresponding to the peak value when both of the maximum continuous trigger count and the maximum continuous non-trigger count of the peak value are smaller than a predetermined value, or decrease the stability parameter corresponding to the peak value when the maximum continuous trigger count or the maximum continuous non-trigger count of the peak value is greater than the predetermined value.

Step 818: Determine whether the stability parameter corresponding to each peak value is greater than a threshold value. If yes, go to Step 820; otherwise, go to Step 824.

Step 820: Perform the step of determining whether there exists an intruding metal in the power transmission range of the induction type power supply system according to the first attenuation slope and the second attenuation slope.

Step 822: Store the updated peak voltage levels to be used in the next time when driving of the supplying-end coil 116 is stopped.

Step 824: End.

Figure 9:
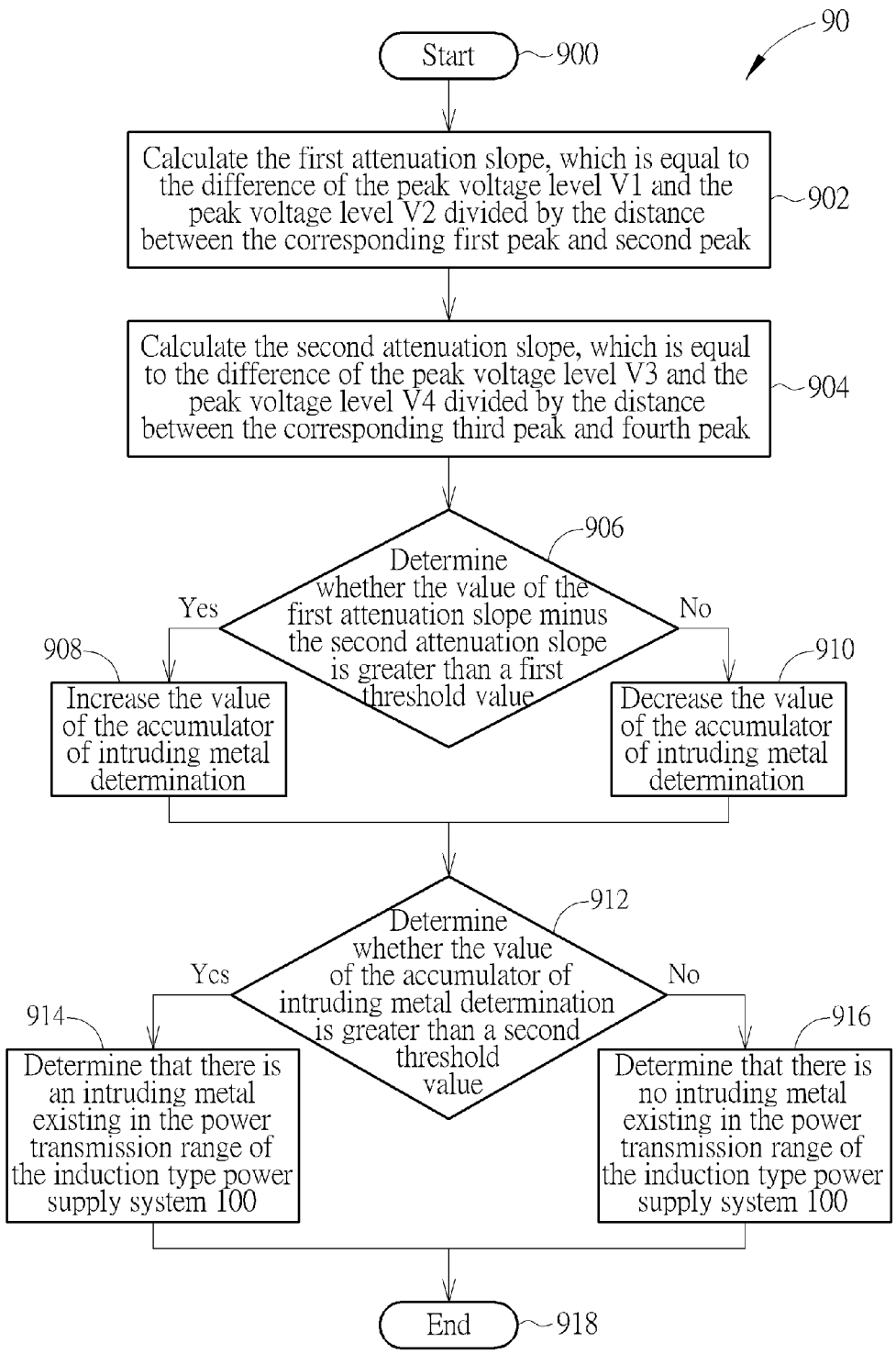
FIG. 9 is a flow chart of a detailed process of intruding metal determination according to an embodiment of the present invention.

After the stability statuses of the peak values of the coil signal are obtained and the coil signal is determined to be stable, the processor may further obtain the attenuation slope and determine the existence of intruding metal accordingly. The related detailed operations may be summarized into a detailed process 90 of intruding metal determination, as shown in FIG. 9. The detailed process 90 of intruding metal determination, which may be used in the processor 111 of the supplying-end module 1 of the induction type power supply system 100, includes the following steps:

Step 900: Start.

Step 902: Calculate the first attenuation slope, which is equal to the difference of the peak voltage level V1 and the peak voltage level V2 divided by the distance between the corresponding first peak and second peak.

Step 904: Calculate the second attenuation slope, which is equal to the difference of the peak voltage level V3 and the peak voltage level V4 divided by the distance between the corresponding third peak and fourth peak.

Step 906: Determine whether the value of the first attenuation slope minus the second attenuation slope is greater than a first threshold value. If yes, go to Step 908; otherwise, go to Step 910.

Step 908: Increase the value of the accumulator of intruding metal determination.

Step 910: Decrease the value of the accumulator of intruding metal determination.

Step 912: Determine whether the value of the accumulator of intruding metal determination is greater than a second threshold value. If yes, go to Step 914; otherwise, go to Step 916.

Step 914: Determine that there is an intruding metal existing in the power transmission range of the induction type power supply system 100.

Step 916: Determine that there is no intruding metal existing in the power transmission range of the induction type power supply system 100.

Step 918: End.

Please note that the method of generating the first attenuation slope and the second attenuation slope in the detailed process 90 of intruding metal determination is only one of various implementations of the present invention. In another embodiment, the peak values of other peaks may be measured to obtain the attenuation slope in the earlier period when driving the supplying-end coil is stopped and the attenuation slope in the latter period when driving the supplying-end coil is stopped, to compare whether the attenuation slope varies during the interruption period. Alternatively, the method shown in FIG. 7 may be applied, where only three comparator modules and three peak voltage levels are used to implement the calculations of the first attenuation slope and the second attenuation slope. In another embodiment, more comparator modules may be applied to track more peak voltages, in order to obtain a more detailed attenuation behavior of the coil signal and further enhance the accuracy of intruding metal determination.

Figure 10:
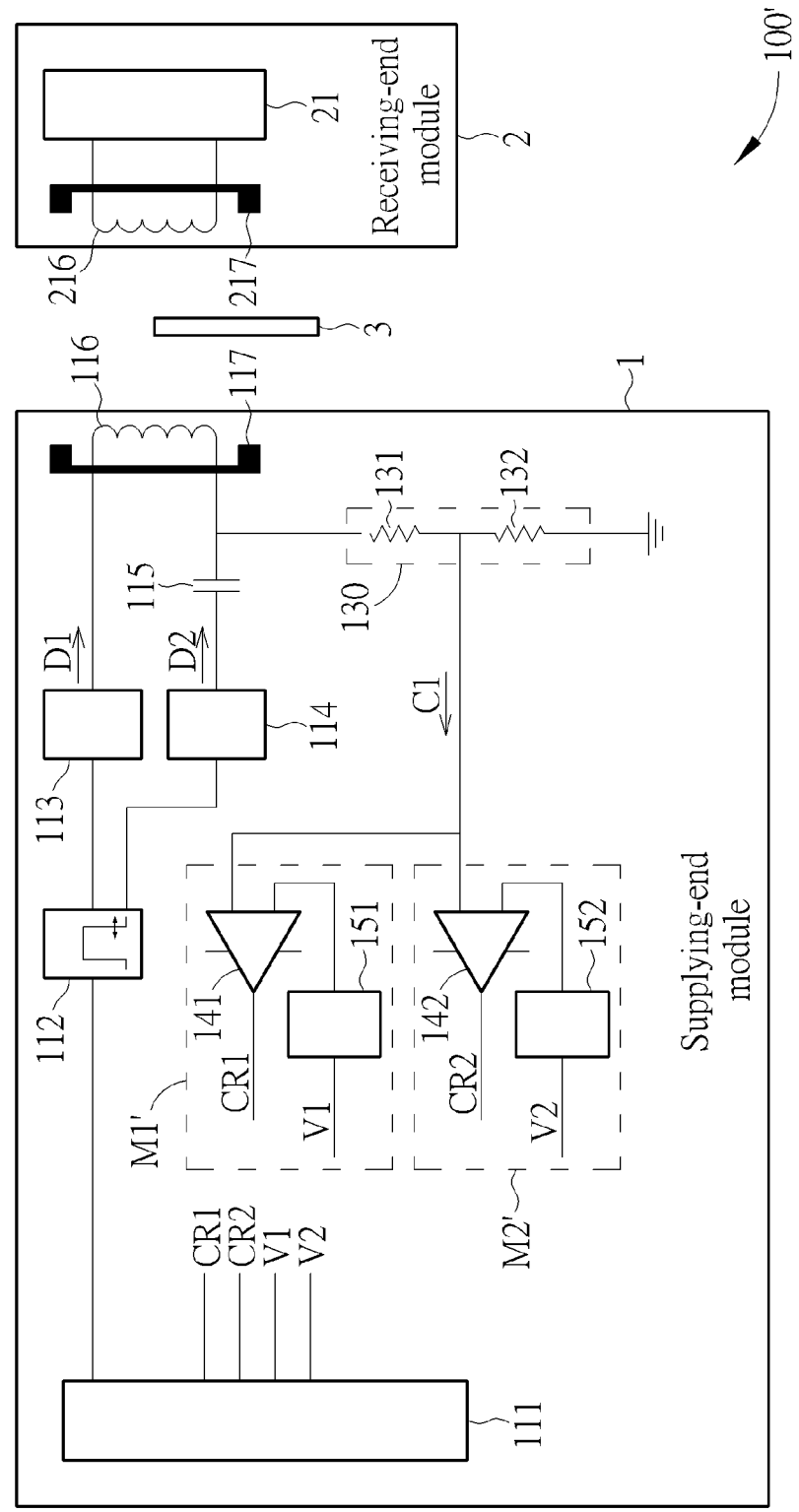
FIG. 10 is a schematic diagram of an induction type power supply system according to an embodiment of the present invention.

In another embodiment, the number of comparator modules may be reduced, and the time period of interrupting driving of the supplying-end coil may be reduced to mitigate the influence of interruption of the driving signal on power transmission. In addition, the reduced number of comparator modules has the benefits of cost reduction. Please refer to FIG. 10, which is a schematic diagram of an induction type power supply system 100' according to an embodiment of the present invention. As shown in FIG. 10, the circuit structure of the induction type power supply system 100' is similar to the circuit structure of the induction type power supply system 100 shown in FIG. 1; hence, the signals and circuit elements having similar functions are denoted by the same symbols. The difference between the induction type power supply system 100' and the induction type power supply system 100 is that, the induction type power supply system 100' only includes two comparator modules M1'-M2', wherein the comparator module M1' is used for determining the length of oscillation cycle of the coil signal C1 and the comparator module M2' is used for comparing the voltages of peak values with different peak voltage levels.

In detail, in the induction type power supply system 100 shown in FIG. 1, each of the comparator modules M1-M4 corresponds to a peak value and its corresponding peak voltage level, for comparing the corresponding peak value with the peak voltage level. In contrast, in the induction type power supply system 100' shown in FIG. 10, the comparator module M2' is used for comparing a plurality of peak values with their corresponding peak voltage levels, respectively. After the processor 111 obtains the length of oscillation cycle of the coil signal C1, the processor 111 may know the peak locations of the coil signal C1 when driving of the supplying-end coil 116 is stopped. Therefore, during the interruption period of the supplying-end coil 116, the processor 111 may respectively output the corresponding peak voltage levels to the comparator module M2' to be compared at every specific peak locations. The comparator module M2' may in turn compare each peak value with the corresponding peak voltage level generated in the previous time driving of the supplying-end coil 116 is stopped. For example, if 4 peak voltage levels V1-V4 are applied to track the voltages of 4 peak values respectively, the processor 111 may respectively output the peak voltage levels V1-V4 to the comparator module M2' at 4 peak locations during a period of stopping driving the supplying-end coil 116. The comparator module M2' then performs the comparison in turn, and responds 4 comparison results CR2 to the processor 111. The processor 111 then determines whether a trigger occurs in the 4 comparison results CR2 and adjusts the values of the peak voltage levels V1-V4 accordingly. Therefore, the processor 111 may determine the intruding metal according to the values of the peak voltage levels V1-V4.

In addition, in the induction type power supply system 100' shown in FIG. 10, the comparator module M1' is used for determining the length of oscillation cycle of the coil signal C1. In this embodiment, the comparator module M1' obtaining the length of oscillation cycle of the coil signal C1 and the comparator module M2' tracking the peak voltages are performed at the same time, in order to reduce the time required for stopping driving the supplying-end coil 116. As mentioned above, the oscillation frequency during a small period when driving of the supplying-end coil 116 is stopped may not vary; hence, the processor 111 may apply the length of oscillation cycle, which is obtained in the previous time driving of the supplying-end coil 116 is stopped, to determine the peak locations of the coil signal C1. Similarly, the processor 111 may send the reference voltage level V_ref to the comparator module M1', to determine the time points of two continuous times the coil signal C1 rises to exceed the reference voltage level V_ref according to the output results of the comparator module M1' (e.g., the rising edge of the signal of the comparison result CR1 outputted by the comparator module M1'). Alternatively, the processor 111 may measure the time points of the coil signal C1 rising to exceed the reference voltage level V_ref by more times, to calculate the length of oscillation cycle by averaging the measured values in multiple oscillation cycles of the coil signal C1, in order to enhance the accuracy of determining the length of oscillation cycle. In another embodiment, the falling edge of the signal of the comparison result CR1 may be applied instead, for determining the length of oscillation cycle; this is not limited herein.

Figure 11:
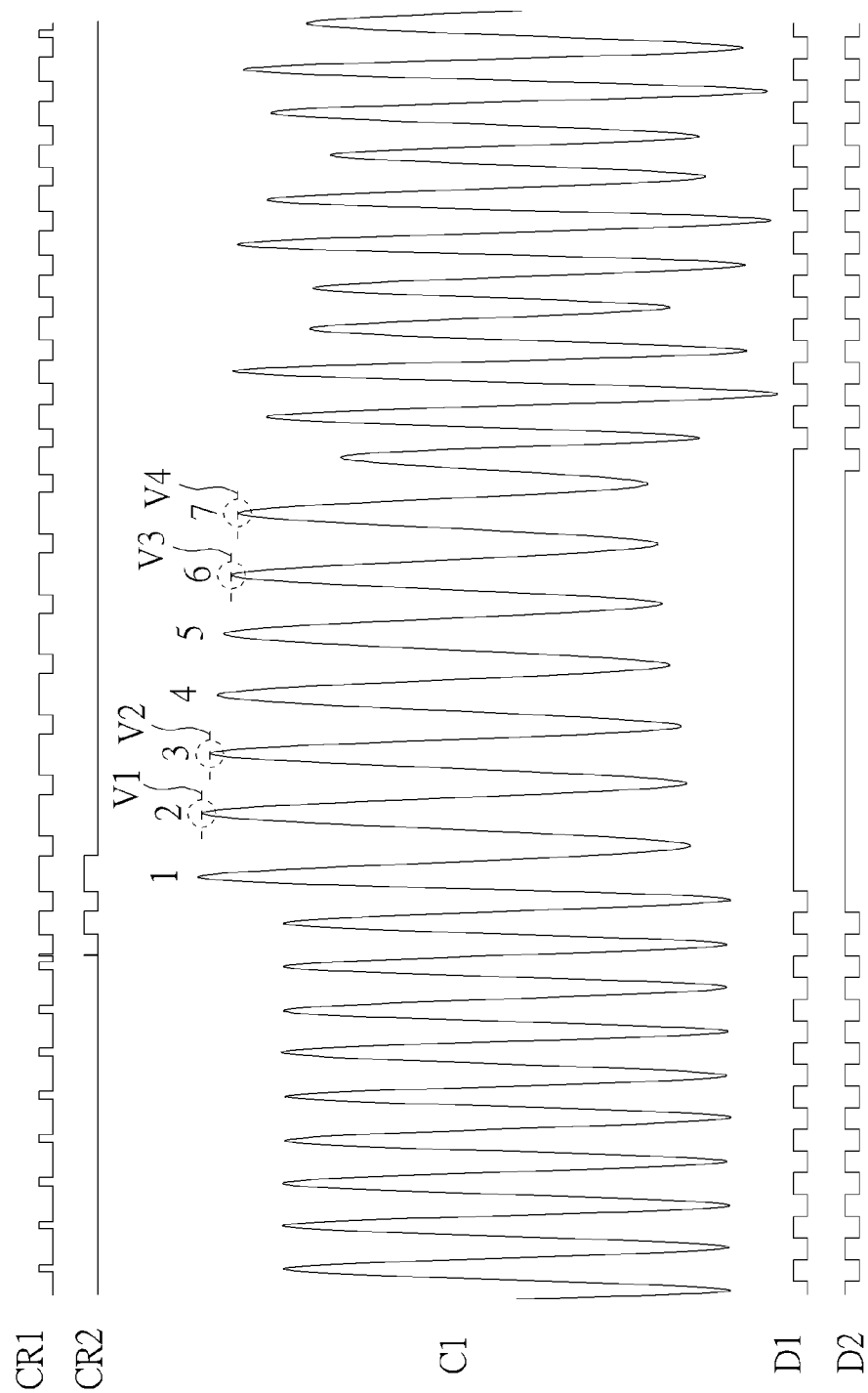
FIG. 11 is a waveform diagram of the attenuation slope of the coil signal determined when driving of the supplying-end coil in the induction type power supply system shown in FIG. 10 is stopped.

Please refer to FIG. 11, which is a waveform diagram of the attenuation slope of the coil signal C1 determined when driving of the supplying-end coil 116 in the induction type power supply system 100' is stopped. FIG. 11 illustrates the coil signal C1, the driving signals D1 and D2 and the comparison results CR1 and CR2. The comparison results CR1 and CR2 are the output signals of the comparator modules M1' and M2' shown in FIG. 10, respectively. When driving of the supplying-end coil 116 is stopped, the processor 111 may output the reference voltage level V_ref to the comparator module M1', to obtain the length of oscillation cycle of the coil signal C1 via the comparator module M1'. The processor 111 may retrieve the peak values in the $2^{nd}$, $3^{rd}$, $6^{th}$ and $7^{th}$ oscillation cycles of the coil signal C1 after driving of the supplying-end coil 116 is stopped. In detail, the processor 111 may in turn output the peak voltage levels V1-V4 to the comparator module M2' at the occurrence time of the $2^{nd}$, $3^{rd}$, $6^{th}$ and $7^{th}$ peaks of the coil signal C1, where the peak voltage levels V1-V4 are updated in the previous time driving of the supplying-end coil 116 is stopped. The processor 111 then in turn receives the comparison results CR2 and updates the values of the peak voltage levels V1-V4 according to the corresponding comparison results CR2. In other words, the processor 111 determines whether the peak voltage levels V1-V4 should rise or fall according to whether there is a trigger in the comparison result CR2 at the corresponding location.

In this embodiment, the interruption period of the driving signals D1 and D2 is quite short, and the length approximately allows the coil signal C1 to naturally oscillate 7 cycles. Furthermore, since the processor 111 already knows the oscillation frequency and the peak locations of the coil signal C1 when driving is stopped, the driving frequency of the driving signals D1 and D2 may be set to be equal to the oscillation frequency of the coil signal C1 when driving is stopped. When the driving-stopped period of the supplying-end coil 116 finishes, the processor 111 may directly activate the operations of the driving signals D1 and D2 with the same frequency, allowing the waveforms of the driving signals D1 and D2 to be connected with the oscillation waveform of the coil signal C1. As a result, the driving capability of the coil signal C1 may be recovered rapidly. When the waveforms are successfully connected, the amplitude of the coil signal C1 may not burst instantly to burn out the circuit elements.

Please note that in the embodiments shown in FIG. 11, the driving signals D1 and D2 both stay in a high voltage level when stop driving the supplying-end coil 116, but in the embodiments shown in FIG. 4, the driving signals D1 and D2 both stay in the low voltage level when stop driving the supplying-end coil 116. In another embodiment, one of the driving signals D1 and D2 may stay in the high voltage level and the other may stay in the low voltage level when the driving signals D1 and D2 stop driving the supplying-end coil 116. The above control method for interruption of the driving signals D1 and D2 should not be a limit of the present invention.

Furthermore, the above peak voltage levels V1-V4, which are used for tracking the peak values in the $2^{nd}$, $3^{rd}$, $6^{th}$ and $7^{th}$ oscillation cycles of the coil signal C1 after driving is stopped, may be applied to calculate the first attenuation slope and the second attenuation slope of the coil signal C1, in order to determine whether an intruding metal exists according to the difference of the attenuation slopes. The detailed operations are illustrated in the above descriptions and will not be narrated herein. In addition, the comparator module M2' may also be used for tracking the peak values in other oscillation cycles, or other methods may be applied to calculate the first attenuation slope and the second attenuation slope; these are not limited herein.

To sum up, the present invention discloses a method of detecting whether there is an intruding metal in the power transmission range of the induction type power supply system and the related induction type power supply system. During the operations of the supplying-end coil, the driving signals may be interrupted to stop driving the supplying-end coil. When driving of the supplying-end coil is stopped, the processor may obtain the oscillation frequency of the coil signal on the supplying-end coil, and determine the peak locations of the coil signal accordingly. Subsequently, the processor may track the peak voltages via the comparator modules and peak voltage levels, in order to calculate the attenuation slope of the coil signal via the peak voltage levels. During the driving-stopped period of the supplying-end coil, if the variation of the attenuation slope of the coil signal is greater than a predetermined value, the processor may determine that there exists an intruding metal. As a result, the present invention may realize a more effective intruding metal detection according to the determination of the attenuation slope of the coil signal, in order to enhance the protection effects of the induction type power supply system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method used for an induction type power supply system, for detecting whether an intruding metal exists in a power transmission range of the induction type power supply system, the method comprising:
   interrupting at least one driving signal of the induction type power supply system to stop driving a supplying-end coil of the induction type power supply system;
   obtaining a first attenuation slope during a first period when driving of the supplying-end coil is stopped, and obtaining a second attenuation slope during a second period when driving of the supplying-end coil is stopped; and
   determining whether the intruding metal exists in the power transmission range of the induction type power supply system according to the first attenuation slope and the second attenuation slope;
   wherein the second period is later than the first period, and the step of determining whether the intruding metal exists in the power transmission range of the induction type power supply system according to the first attenuation slope and the second attenuation slope comprises:
      increasing a value of an accumulator of intruding metal determination when a value of the first attenuation slope minus the second attenuation slope is greater than a first threshold value;
      decreasing the value of the accumulator of intruding metal determination when the value of the first attenuation slope minus the second attenuation slope is smaller than the first threshold value; and
      determining that the intruding metal exists in the power transmission range of the induction type power supply system when the value of the accumulator of intruding metal determination is greater than a second threshold value.

2. A method used for an induction type power supply system, for detecting whether an intruding metal exists in a power transmission range of the induction type power supply system, the method comprising:
   interrupting at least one driving signal of the induction type power supply system to stop driving a supplying-end coil of the induction type power supply system;
   obtaining a first attenuation slope during a first period when driving of the supplying-end coil is stopped, and obtaining a second attenuation slope during a second period when driving of the supplying-end coil is stopped; and
   determining whether the intruding metal exists in the power transmission range of the induction type power supply system according to the first attenuation slope and the second attenuation slope;
   wherein the step of obtaining the first attenuation slope during the first period when driving of the supplying-end coil is stopped and obtaining the second attenuation slope during the second period when driving of the supplying-end coil is stopped comprises:
      retrieving a plurality of peak values of oscillation on a coil signal of the supplying-end coil when driving of the supplying-end coil is stopped; and
      comparing the plurality of peak values respectively with a corresponding peak voltage level among a plurality of peak voltage levels generated in a previous time driving of the supplying-end coil is stopped.

3. The method of claim 2, wherein a number of the plurality of peak voltage levels is equal to a number of the plurality of retrieved peak values, and the plurality of peak voltage levels track voltages of the plurality of peak values, respectively.

4. The method of claim 3, further comprising:
when a peak value among the plurality of peak values reaches the corresponding peak voltage level among the plurality of peak voltage levels, increasing a value of the peak voltage level, and when the peak value fails to reach the peak voltage level, decreasing the value of the peak voltage level, allowing the peak voltage level to track the voltage of the peak value.

5. The method of claim 2, wherein the plurality of peak values comprise a first peak value, a second peak value, a third peak value and a fourth peak value, which are values of a first peak, a second peak, a third peak and a fourth peak, respectively, in natural oscillation of the coil signal when driving of the supplying-end coil is stopped, wherein the first attenuation slope is equal to a difference of the first peak voltage level and the second peak voltage level divided by a distance between the first peak and the second peak, and the second attenuation slope is equal to a difference of the third peak voltage level and the fourth peak voltage level divided by a distance between the third peak and the fourth peak.

6. The method of claim 2, wherein the plurality of peak values comprise a first peak value, a second peak value and a third peak value, which are values of a first peak, a second peak and a third peak, respectively, in natural oscillation of the coil signal when driving of the supplying-end coil is stopped, wherein the first attenuation slope is equal to a difference of the first peak voltage level and the second peak voltage level divided by a distance between the first peak and the second peak, and the second attenuation slope is equal to a difference of the second peak voltage level and the third peak voltage level divided by a distance between the second peak and the third peak.

7. The method of claim 2, further comprising:
determining whether the coil signal of the supplying-end coil is in a stable status according to a plurality of stability parameters corresponding to the plurality of peak values, wherein when the plurality of stability parameters are larger, the coil signal is more stable;
determining a maximum continuous trigger count and a maximum continuous non-trigger count during a third period, wherein the maximum continuous trigger count is a maximum number of times a peak value among the plurality of peak values continuously reaches a peak voltage level corresponding to the peak value among the plurality of peak voltage levels, and the maximum continuous non-trigger count is a maximum number of times the peak value continuously fails to reach the peak voltage level; and
increasing a stability parameter among the plurality of stability parameters corresponding to the peak value when both of the maximum continuous trigger count and the maximum continuous non-trigger count are smaller than a predetermined value, or decreasing the stability parameter when at least one of the maximum continuous trigger count and the maximum continuous non-trigger count is greater than the predetermined value.

8. The method of claim 7, further comprising:
performing the step of determining whether the intruding metal exists in the power transmission range of the induction type power supply system according to the first attenuation slope and the second attenuation slope when the plurality of stability parameters are greater than a threshold value; and
stopping performing the step of determining whether the intruding metal exists in the power transmission range of the induction type power supply system according to the first attenuation slope and the second attenuation slope when at least one of the plurality of stability parameters is smaller than the threshold value.

9. An induction type power supply system comprising a supplying-end module, the supplying-end module comprising:
a supplying-end coil;
a resonant capacitor, coupled to the supplying-end coil, for performing resonance together with the supplying-end coil;
at least one power driver unit, coupled to the supplying-end coil and the resonant capacitor, for sending at least one driving signal to the supplying-end coil to drive the supplying-end coil to generate power and interrupting the at least one driving signal to stop driving the supplying-end coil; and
a processor, for receiving a coil signal of the supplying-end coil and performing the following steps:
obtaining a first attenuation slope during a first period when driving of the supplying-end coil is stopped, and obtaining a second attenuation slope during a second period when driving of the supplying-end coil is stopped; and
determining whether an intruding metal exists in the power transmission range of the induction type power supply system according to the first attenuation slope and the second attenuation slope;
wherein the second period is later than the first period, and the processor further performs the following steps to determine whether the intruding metal exists in the power transmission range of the induction type power supply system according to the first attenuation slope and the second attenuation slope:
increasing a value of an accumulator of intruding metal determination when a value of the first attenuation slope minus the second attenuation slope is greater than a first threshold value;
decreasing the value of the accumulator of intruding metal determination when the value of the first attenuation slope minus the second attenuation slope is smaller than the first threshold value; and
determining that the intruding metal exists in the power transmission range of the induction type power supply system when the value of the accumulator of intruding metal determination is greater than a second threshold value.

10. An induction type power supply system comprising a supplying-end module, the supplying-end module comprising:
a supplying-end coil;
a resonant capacitor, coupled to the supplying-end coil, for performing resonance together with the supplying-end coil;
at least one power driver unit, coupled to the supplying-end coil and the resonant capacitor, for sending at least one driving signal to the supplying-end coil to drive the supplying-end coil to generate power and interrupting the at least one driving signal to stop driving the supplying-end coil;
a processor, for receiving a coil signal of the supplying-end coil and performing the following steps:

obtaining a first attenuation slope during a first period when driving of the supplying-end coil is stopped, and obtaining a second attenuation slope during a second period when driving of the supplying-end coil is stopped; and determining whether an intruding metal exists in the power transmission range of the induction type power supply system according to the first attenuation slope and the second attenuation slope; and a plurality of comparator modules, coupled to the processor, each of the plurality of comparator modules for retrieving a corresponding peak value among a plurality of peak values of oscillation on the coil signal when driving of the supplying-end coil is stopped, and comparing the peak value with a peak voltage level corresponding to the peak value among a plurality of peak voltage levels generated in a previous time driving of the supplying-end coil is stopped.

11. An induction type power supply system comprising a supplying-end module, the supplying-end module comprising:
   a supplying-end coil;
   a resonant capacitor, coupled to the supplying-end coil, for performing resonance together with the supplying-end coil;
   at least one power driver unit, coupled to the supplying-end coil and the resonant capacitor, for sending at least one driving signal to the supplying-end coil to drive the supplying-end coil to generate power and interrupting the at least one driving signal to stop driving the supplying-end coil;
   a processor, for receiving a coil signal of the supplying-end coil and performing the following steps:
      obtaining a first attenuation slope during a first period when driving of the supplying-end coil is stopped, and obtaining a second attenuation slope during a second period when driving of the supplying-end coil is stopped; and
      determining whether an intruding metal exists in the power transmission range of the induction type power supply system according to the first attenuation slope and the second attenuation slope; and
   a comparator module, coupled to the processor, for respectively retrieving a plurality of peak values of oscillation on the coil signal when driving of the supplying-end coil is stopped, and in turn comparing a peak value among the plurality of peak values with a peak voltage level corresponding to the peak value among a plurality of peak voltage levels generated in a previous time driving of the supplying-end coil is stopped.

12. The induction type power supply system of claim 10, wherein a number of the plurality of peak voltage levels is equal to a number of the plurality of retrieved peak values, and the plurality of peak voltage levels track voltages of the plurality of peak values, respectively.

13. The induction type power supply system of claim 12, wherein the processor further performs the following step:
   when a peak value among the plurality of peak values reaches the corresponding peak voltage level among the plurality of peak voltage levels, increasing a value of the peak voltage level, and when the peak value fails to reach the peak voltage level, decreasing the value of the peak voltage level, allowing the peak voltage level to track the voltage of the peak value.

14. The induction type power supply system of claim 10, wherein the plurality of peak values comprise a first peak value, a second peak value, a third peak value and a fourth peak value, which are values of a first peak, a second peak, a third peak and a fourth peak, respectively, in natural oscillation of the coil signal when driving of the supplying-end coil is stopped, wherein the first attenuation slope is equal to a difference of the first peak voltage level and the second peak voltage level divided by a distance between the first peak and the second peak, and the second attenuation slope is equal to a difference of the third peak voltage level and the fourth peak voltage level divided by a distance between the third peak and the fourth peak.

15. The induction type power supply system of claim 10, wherein the plurality of peak values comprise a first peak value, a second peak value and a third peak value, which are values of a first peak, a second peak and a third peak, respectively, in natural oscillation of the coil signal when driving of the supplying-end coil is stopped, wherein the first attenuation slope is equal to a difference of the first peak voltage level and the second peak voltage level divided by a distance between the first peak and the second peak, and the second attenuation slope is equal to a difference of the second peak voltage level and the third peak voltage level divided by a distance between the second peak and the third peak.

16. The induction type power supply system of claim 10, wherein the processor further performs the following steps:
   determining whether the coil signal of the supplying-end coil is in a stable status according to a plurality of stability parameters corresponding to the plurality of peak values, wherein when the plurality of stability parameters are larger, the coil signal is more stable;
   determining a maximum continuous trigger count and a maximum continuous non-trigger count during a third period, wherein the maximum continuous trigger count is a maximum number of times a peak value among the plurality of peak values continuously reaches a peak voltage level corresponding to the peak value among the plurality of peak voltage levels, and the maximum continuous non-trigger count is a maximum number of times the peak value continuously fails to reach the peak voltage level; and
   increasing a stability parameter among the plurality of stability parameters corresponding to the peak value when both of the maximum continuous trigger count and the maximum continuous non-trigger count are smaller than a predetermined value, or decreasing the stability parameter when at least one of the maximum continuous trigger count and the maximum continuous non-trigger count is greater than the predetermined value.

17. The induction type power supply system of claim 16, wherein the processor further performs the following steps:
   performing the step of determining whether the intruding metal exists in the power transmission range of the induction type power supply system according to the first attenuation slope and the second attenuation slope when the plurality of stability parameters are greater than a threshold value; and
   stopping performing the step of determining whether the intruding metal exists in the power transmission range of the induction type power supply system according to the first attenuation slope and the second attenuation slope when at least one of the plurality of stability parameters is smaller than the threshold value.

18. A method used for an induction type power supply system, for detecting whether an intruding metal exists in a power transmission range of the induction type power supply system, the method comprising:
- interrupting at least one driving signal of the induction type power supply system to stop driving a supplying-end coil of the induction type power supply system;
- setting a reference voltage level;
- detecting a coil signal of the supplying-end coil to obtain time points of two continuous times the coil signal rises to exceed the reference voltage level when driving of the supplying-end coil is stopped;
- obtaining a length of oscillation cycle of the coil signal when driving of the supplying-end coil is stopped according to the time points of two continuous times the coil signal rises to exceed the reference voltage level; and
- obtaining an attenuation slope of the coil signal when driving of the supplying-end coil is stopped according to the length of oscillation cycle.

19. The method of claim 18, wherein the step of obtaining the length of oscillation cycle of the coil signal when driving of the supplying-end coil is stopped according to the time points of two continuous times the coil signal rises to exceed the reference voltage level comprises:
- starting a timer at a first time point of the coil signal rising to exceed the reference voltage level during a first resonance cycle when driving of the supplying-end coil is stopped;
- stopping the timer at a second time point of the coil signal rising to exceed the reference voltage level during a second resonance cycle next to the first resonance cycle; and
- obtaining an elapsed time of the timer and setting the elapsed time as the length of oscillation cycle.

20. The method of claim 18, wherein the reference voltage level is equal to or near a zero voltage level.

* * * * *